United States Patent
Tabata et al.

(10) Patent No.: US 6,178,372 B1
(45) Date of Patent: Jan. 23, 2001

(54) MOTOR VEHICLE DRIVE SYSTEM CONTROLLER AND AUTOMATIC DRIVE CONTROLLER

(75) Inventors: Atsushi Tabata, Okazaki; Kagenori Fukumura, Toyota; Yasunari Nakamura; Hideo Tomomatsu, both of Nagoya; Hiroji Taniguchi, Okazaki, all of (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/371,006

(22) Filed: Aug. 10, 1999

Related U.S. Application Data

(62) Division of application No. 08/870,386, filed on Jun. 6, 1997, now Pat. No. 6,125,321.

(30) Foreign Application Priority Data

Jun. 7, 1996 (JP) .................................................. 8-145834
Dec. 16, 1996 (JP) .................................................. 8-336181

(51) Int. Cl.[7] ...................................................... B60T 7/12
(52) U.S. Cl. .............................. 701/97; 701/93; 701/95; 340/436; 340/901; 340/903; 180/167; 123/352
(58) Field of Search .................................. 701/97, 92, 93, 701/95, 200, 301, 62; 340/903, 436, 467, 901, 425.5; 123/352, 351; 180/167, 168

(56) References Cited

U.S. PATENT DOCUMENTS

| | | | | |
|---|---|---|---|---|
| 4,700,563 | * | 10/1987 | Iwata et al. ......................... | 73/118.1 |
| 4,934,476 | * | 6/1990 | Hyodo .................................. | 180/176 |
| 5,125,471 | * | 6/1992 | Iwaoka et al. ....................... | 180/179 |
| 5,230,400 | * | 7/1993 | Kakinami et al. .................... | 180/169 |
| 5,485,892 | * | 1/1996 | Fujita .................................. | 180/167 |

* cited by examiner

Primary Examiner—William A. Cuchlinski, Jr.
Assistant Examiner—Yonel Beaulieu
(74) Attorney, Agent, or Firm—Oblon, Spivak, McClelland, Maier & Neustadt, P.C.

(57) ABSTRACT

A motor vehicle drive system controller is adapted to automatic drive control, the engine and the transmission being among the objects of control. The power output of the motor is controlled so as to maintain either a consistent drivable mode or a consistent undrivable mode as the automatic transmission shifts gears while the vehicle is running under automatic drive control. The consistent drivable mode refers to a state where the output torque of the motor is greater than the sum of the average running resistance and the variation in the running resistance and the consistent undrivable mode refers to a state where the output torque of the motor is smaller than the difference of the average running resistance and the variation in the running resistance. The automatic drive control function is prohibited when the controller detects abnormality in the transmission.

6 Claims, 24 Drawing Sheets

| POSITION | | | CLUTCH | | | BRAKE | | | | | OWC | | |
|---|---|---|---|---|---|---|---|---|---|---|---|---|---|
| | | | C-1 | C-2 | C-0 | B-1 | B-2 | B-3 | B-4 | B-0 | F-1 | F-2 | F-0 |
| P | | | X | X | O | X | X | X | X | X | X | X | X |
| R | | | X | O | O | X | X | X | O | X | X | X | O |
| | WHEN UNDER O/D CONTROL | | X | O | X | X | X | X | O | O | X | X | X |
| | WHEN PROHIBITED | | X | X | X | X | X | X | X | O | X | X | X |
| N | | | X | X | O | X | X | X | X | O | X | X | X |
| D | 1ST | NORMAL | O | X | O | X | X | X | X | X | X | O | O |
| | | E/G BRAKE | O | X | O | X | X | X | O | X | X | O | O |
| | 2ND | NORMAL | O | X | X | X | X | O | X | X | X | X | O |
| | | E/G BRAKE | O | X | O | X | X | O | X | X | X | X | O |
| | 3RD | NORMAL | O | X | O | X | O | X | X | X | O | X | O |
| | | E/G BRAKE | O | X | O | O | O | X | X | X | O | X | O |
| | 4TH | | O | O | O | X | O | X | X | X | X | X | O |
| | 5TH | | O | O | X | X | O | X | X | O | X | X | O |
| 3 | 1ST | NORMAL | O | X | O | X | X | X | X | X | X | O | O |
| | | E/G BRAKE | O | X | O | X | X | X | O | X | X | O | O |
| | 2ND | NORMAL | O | X | X | X | X | O | X | X | X | X | O |
| | | E/G BRAKE | O | X | O | X | X | O | X | X | O | X | O |
| | 3RD | NORMAL | O | X | O | X | O | X | X | X | O | X | O |
| | | E/G BRAKE | O | X | O | O | O | X | X | X | O | X | O |
| | 4TH | | O | O | O | X | O | X | X | X | X | O | O |
| 2 | 1ST | NORMAL | O | X | O | X | X | X | X | X | X | O | O |
| | | E/G BRAKE | O | X | O | X | X | X | O | X | X | O | O |
| | 2ND | NORMAL | O | X | X | X | X | O | X | X | X | X | O |
| | | E/G BRAKE | O | X | O | X | X | O | X | X | X | X | O |
| | 3RD | E/G BRAKE | O | X | O | O | O | X | X | X | O | X | O |
| L | 1ST | E/G BRAKE | O | X | O | X | X | X | O | X | X | O | O |
| | 2ND | E/G BRAKE | O | X | O | X | X | O | X | X | X | X | O |
| P·N R D 3 2 L | GEAR POSITION WHEN ALL SOLENOIDS ARE OFF | (N) | X | X | X | X | X | X | X | O | X | X | X |
| | | (R) | X | O | X | X | X | X | O | O | X | X | X |
| | | (5TH) | O | O | X | X | O | X | X | X | X | X | O |
| | | (4TH) | O | O | O | X | O | X | X | X | X | O | O |
| | | (3RD) | O | X | O | O | O | X | X | X | O | X | O |
| | | (1ST) | O | X | O | X | X | X | O | X | X | O | O |
| REMARKS | O | | ENGAGED | | | | | | | | LOCKED | | |
| | X | | RELEASED | | | | | | | | FREE | | |

|  | ORDINARY SETTING (D-RANGE) | SETTING AT STEP S50 |
|---|---|---|
| 5th GEAR | ○ | ○ |
| 4th GEAR | ○ | ○ |
| 3rd GEAR | × | ○ |
| 2nd GEAR | × | ○ |
| 1st GEAR | × | × |

○ : ENGINE BRAKING AVAILABLE
× : ENGINE BRAKING NOT AVAILABLE

MOTOR VEHICLE DRIVE SYSTEM CONTROLLER AND AUTOMATIC DRIVE CONTROLLER

This application is a Division of Ser. No. 08/870,386 filed Jun. 6, 1997, now U.S. Pat. No. 6,125,321.

BACKGROUND OF THE INVENTION

1. Field of the Invention

This invention relates to a motor vehicle drive system controller, particularly to a motor vehicle drive system controller of the type adapted to controlling the operation of the automatic drive system to optimize the running speed of a motor vehicle by controlling the power output of the engine or the electric motor and controlling the gear selection of the automatic transmission according to a set of given parameters.

2. Description of the Related Art

Demand for automatic motor vehicle drive systems that can effectively reduce the physical and psychological load on the part of the driver by automatically controlling some of the operations of driving the motor vehicle for the driver has increased. Currently available motor vehicle drive system controllers are mostly designed to control the running speed of the motor vehicle by controlling the opening of the engine throttle valve. On the other hand, motor vehicle drive system controllers designed to control the running speed of the motor vehicle by controlling not only the opening of the engine throttle valve, but also the gear-shifting operation of the automatic transmission have been proposed and commercialized with some success.

An automatic drive controller is typically either of a constant speed type or of a follower type. A constant speed type automatic drive controller controls the motor vehicle drive system including the engine in such a way that the motor vehicle is constantly driven to run at an intended speed. On the other hand, with a follower type automatic drive controller, the motor vehicle is made to follow an arbitrarily selected preceding vehicle, constantly maintaining a given distance from that vehicle. The arbitrarily selected lead vehicle is also called a target vehicle. Automatic drive controllers that can operate both in a constant speed mode and in a follower mode have also been proposed. With such a controller, the motor vehicle is driven to move at a constant speed until a target vehicle is caught in sight, when the automatic vehicle drive operation is switched to the follower mode.

A follower type controller determines the distance separating the leading vehicle and itself by means of a radar and then calculates a desired inter-vehicular distance for the follower on the basis of the speed of the leading vehicle detected by a speed sensor. The motor vehicle drive system is then so controlled as to make the actual inter-vehicular distance agree with the desired value. The motor vehicle may have to adapt itself to sudden deceleration of the leading vehicle and a motor vehicle suddenly intervening between the leading vehicle and the following vehicle. The automatic transmission then shifts gears down and the follower vehicle is decelerated by the braking effect of the engine.

Japanese Patent Laid-open Publication No. Hei 6-11200 discloses an automatic drive controller that determines the inter-vehicular distance between the leading vehicle and the following vehicle by means of a laser radar and, once a shortened distance is detected, causes the automatic transmission to downshift gears to decelerate the motor vehicle.

Japanese Patent Laid-Open Publication No. Hei 4-208647 teaches an automatic drive controller for controlling the automatic transmission so as to cause it to appropriately shift gears and drive the motor vehicle at a constant running speed. The controller shown in that publication causes the automatic transmission to shift gears down for accelerating the moving vehicle and up when the target speed is achieved. Japanese Patent Laid-Open Publication No. Hei 7-304349 also described an automatic drive controller for driving a motor vehicle at a constant running speed by controlling the operation of the automatic transmission.

In a related technological field, a control apparatus for regulating the running speed of a motor vehicle by locking up the torque convert apparatus is disclosed by the applicant of the present patent application in Japanese Patent Application No. Hei 8-147084. With this apparatus, a lock-up clutch arranged in parallel with the torque converter is engaged to produce a locked-up state or a locked-up slipping state whenever necessary in order to realize an enhanced level of deceleration.

A motor vehicle is driven by the motor vehicle drive system either in a drivable mode or in an undrivable mode as shown in FIG. 1 of the accompanying drawings, which is a graph schematically illustrating the relationship between the engine torque T (axis of ordinate) and the running speed v (axis of abscissa) of the motor vehicle. In the drivable mode, the drive force of the motor vehicle engine exceeds the running resistance of the motor vehicle (hereinafter referred simply as "running resistance") and the engine is positively driving the motor vehicle. On the other hand, in the undrivable mode the drive force of the engine falls below the running resistance and the motor vehicle may be decelerated by the braking effect of the engine.

The gear-shifting operation of the automatic transmission is controlled differently in the drivable mode and in the undrivable mode. This difference may be attributable to the structural requirements of the transmission, as will be described in greater detail hereinafter, or to the requirement of alleviating the impact at the time of shifting gears and improving the driver's comfort in the running motor vehicle. Thus, the automatic drive controller is required to determine if the motor vehicle is in a drivable mode or in an undrivable mode at the time of shifting gears in order to properly control the automatic transmission. This operation of finding out the driving mode on the part of the automatic drive controller is typically carried out on the basis of the throttle opening and the running speed of the motor vehicle detected by the speedometer as shown in FIG. 2. In FIG. 2, the axis of abscissa and that of ordinate respectively represent the motor vehicle running speed v and the throttle opening $\theta$. The solid curve in FIG. 2 indicates the reference running resistance or the reference resistive throttle opening of the engine, which is determined by converting the running resistance of FIG. 1 into the throttle opening according to a predetermined relationship between the engine torque and the throttle opening. Then, the mode of operation of the engine is determined by comparing the detected throttle opening $\theta$ and the reference resistive throttle opening for the detected running speed of the motor vehicle.

A typical situation where the operation of shifting gears is carried out by the automatic drive controller while determining if the motor vehicle running in a drivable mode or in an undrivable mode is when the running motor vehicle needs to be quickly decelerated while it is following a target vehicle. In such a situation, the gears must be shifted the instant when such deceleration is determined necessary. Thus, when deceleration is requested and it is detected that the motor vehicle is running in a drivable mode, the gear-shifting operation has to be controlled in a manner adapted to the drivable mode. When, on the other hand, deceleration is requested and the motor vehicle is found to be running in an undrivable mode, the gear-shifting operation has to be so controlled as to adapt itself to the undrivable mode. The throttle may have to be simultaneously closed, totally if necessary, for further deceleration.

Example situation in which the gear-shifting operation has to be conducted differently in drivable and undrivable modes A situation where the gear-shifting operation has to be conducted differently in the drivable mode and in the undrivable mode will now be described by way of an example.

FIG. 3 is a schematic diagram of an automatic transmission described in Japanese Patent Laid-Open Publication No. Hei 6-341522 and FIG. 4 is an operation chart of the frictional engaging devices of the automatic transmission for different gear positions. Referring to FIG. 3, the automatic transmission includes a 5-step transmission gear mechanism and a hydraulic control unit for controlling the operation of the transmission gear mechanism. It comprises an auxiliary transmission OD including a front overdrive planetary gear unit in combination with a main transmission M for 4-step forward drive and 1-step rearward drive including a simply linked train of three planetary gears.

The automatic transmission comprises, in addition to the auxiliary transmission OD and the main transmission M as listed above, a torque converter T having a lock-up clutch. The auxiliary transmission OD is provided with a first one-way clutch F-0 and a multi-disc clutch C-0 arranged in parallel and associated with a sun gear S0, a carrier C0 and a ring gear R0, along with a multi-disc brake B-0 connected in series with the first one-way clutch C-0. On the other hand, the main transmission M comprises three sets of simply linked planetary gear units P1, P2 and P3 realized by appropriately and directly connecting various transmission elements including sun gears S1–S3, carriers C1–C3 and ring gears R1–R3. There are also provided multi-disc clutches C-1, C-2, a band brake B-1, multi-disc brakes B-2 through B4, a one-way clutch F-1 and a second one-way clutch F-2 in association with the transmission elements of each of the gear units. Additionally, each of the clutches and the brakes is provided with a servo system (not shown) having a piston for engaging/disengaging its frictional members that is controlled under servo hydraulic pressure.

Now, assume that the top (5th) gear must be shifted down to the 4th gear and this gear-shifting operation must be conducted differently in a drivable mode and in an undrivable mode. Note that the sense of rotation of the automatic transmission as described herein represents the one as viewed from the engine side.

With the above described automatic transmission, the rotary power output of the engine (not shown) is transmitted to the input shaft I of the auxiliary transmission OD. Referring now to FIG. 4, the 4th gear is selected when the clutch C-0 is engaged to fix the auxiliary transmission OD, while the clutches C-1 and C-2 of the main transmission M are engaged, and all the remaining frictional engaging members are disengaged. The gear unit P2 is directly linked under this condition because the rotary power input is transmitted to the ring gear R2 and the sun gear S2. In other words, the rotary power input is simply output by the automatic transmission. It will be understood that the motor vehicle is constantly subjected to the braking effect of the engine when the vehicle is driven to run by the axle (and hence in an undrivable mode) under this condition. When the main transmission is in the 4th gear, the clutch C-0 is disengaged and the brake B-0 is made operative in the auxiliary transmission OD to realize a shift to the top gear. In the top gear the sun gear S0 is locked and rotating speed increase at the auxiliary transmission OD.

For the downward gear-shifting operation from the top gear to the 4th gear with the above automatic transmission, the brake B-0 is released and the clutch C-0 is engaged. If the motor vehicle is running in a drivable mode when the brake B-0 is released, the sun gear S0 attempts to rotate clockwise relative to the carrier C0. This rotary motion is blocked by the one-way clutch F-0. In other words, as the brake B-0 is released, both the carrier C0 and the sun gear S0 rotate under the effect of the one-way clutch F-0. Considering this functional configuration, it is so arranged with this automatic transmission that the timing of gear shifting operation is controlled by the one-way clutch F-0 in the drivable mode.

If, on the other hand, the brake B-0 is released in an undrivable mode, the sun gear S0 tries to rotate counter-clockwise relative to the carrier C0. This rotary motion is not blocked by the one-way clutch F-0. In other words, the timing of gear shifting operation is not controlled by the one-way clutch F-0 in the undrivable mode and the impact of gear shifting operation is alleviated exclusively by controlling the pressure under which the clutch C-0 is engaged.

Thus, with an automatic transmission as illustrated in FIG. 3, the downward gear shifting operation from the top gear to the 4th gear differs in the drivable and undrivable modes and this difference normally occurs with any other gear shifting operations and also with any automatic transmissions having a configuration different from the one illustrated in FIG. 3. Note, however, that a gear shifting operation may be conducted differently in the drivable mode and in the undrivable mode even if such a difference is not structurally required. Gear shifting operations for other than the 4th and top gears may be understood by referring to FIG. 4 and hence will not be further described.

Gear shifting operations without relying on an automatic drive controller are performed by the driver using the accelerator and the brake, while those relying on an automatic drive controller are carried out without driver input. Thus, the driver will be more startled by a gear shifting operation relying on an automatic drive controller than by a similar operation that does not rely on the automatic drive controller. Therefore, gear shifting operation impact must be minimized when the motor vehicle is running under the control of an automatic drive controller.

Conventionally, an automatic drive controller determines if the motor vehicle is running in a drivable mode or in an undrivable mode in a manner as described above and conducts a gear shifting operation that is adapted to the determined mode. However, since the running resistance of a motor vehicle can vary as a function of not only the running speed of the vehicle, but also of the gradient, the surface conditions (the coefficient of friction of the road, etc.) on which the vehicle is running and other factors, the reference running resistance does not necessarily agree with the actual running resistance. Therefore, there always exists an ambiguous zone where whether the motor vehicle is running in a drivable mode or in an undrivable mode cannot be determined. Although it is possible to directly find out the mode of operation of the engine by means of a specifically designed detector, be it a drivable mode or an undrivable mode, installation of such an additional detector is costly and involves complex control procedures.

As described above, because there exists an ambiguous zone where it cannot be determined whether the motor vehicle is running in a drivable mode or in an undrivable mode and it is possible for the automatic drive controller to mistake a drivable mode for an undrivable mode. In such a situation, the automatic drive controller shifts gears in a manner suitable for the undrivable mode although it should operate for the drivable mode, or vice versa. Gear shifting operations not adapted to the correct mode may cause discomfort to the driver. Additionally, there may be instances where the automatic drive controller determines that the motor vehicle is running in a drivable mode and begins shifting gears in a correct manner for that mode but the mode changes during the gear shifting operation and consequently the driver is subjected to impact due to an improper gear shifting operation. Troubles of this sort should obviously be minimized.

In existing automatic drive controllers including the one disclosed in Japanese Patent Laid-Open Publication No. Hei 6-11200 referred to earlier, the transmission constitutes at least one of the objects to be controlled by the automatic drive controller. The transmission is expected to consistently operate properly and situations where the transmission fails are not taken into consideration. This will be illustrated in greater detail by way of an apparatus like the one disclosed in the above listed patent document designed for controlling both the engine and the automatic transmission in a coordinated manner.

Generally, an automatic transmission is provided with a hydraulic control unit and is actuated by the operation of a solenoid of this hydraulic control unit. If the solenoid fails, the automatic transmission would not shift gears and deceleration would not be boosted by a downward gear shifting operation. Additionally, the lock-up clutch can become uncontrollable and the engine braking effect can become unobtainable.

Thus, if the solenoid of the automatic transmission fails, the engine must be controlled so as to make up for the missing automatic transmission functionality. For example, it may be necessary to compensate for a deceleration effect normally obtained by controlling the automatic transmission by modifying the opening of the electronic throttle of the engine or the extent of fuel cut for the engine. However, such an arrangement of compensating for an automatic transmission missing function by controlling the engine can be costly and entail complex control procedures.

The above identified problem is not limited to controlling both the engine and the automatic transmission and a similar problem arises when the motive power of the motor vehicle comes from an electric motor or some other power source, or when automatic transmission and brake control are to be coordinated.

SUMMARY OF THE INVENTION

In light of the above, it is an object of the present invention to provide a motor vehicle drive system controller adapted to reducing the impact that occurs at the time of shifting gears when the automatic drive controller is in operation. The present invention particular addresses the ambiguous zone where the drivable mode and the undrivable mode are undiscriminable. The disclosed controller can effectively reduce the impact that occurs during gear shifting.

According to the present invention, the above object is achieved by providing a motor vehicle drive system controller adapted to automatic drive control of controlling the power output of the motor and the gear shifting operation of the automatic transmission in order to regulate the running speed of the vehicle according to a set of given parameters, characterized in that it controls the power output of the motor so as to maintain either a consistent drivable mode or a consistent undrivable mode when the automatic transmission shifts gears while the vehicle is running under automatic drive control.

For the purpose of the present invention, the term "motor" refers to the motive power source of a motor vehicle that may be a gasoline engine, a diesel engine, an electric motor or other power source. The power output of the motor is regulated typically by controlling the opening of the throttle valve, if the motor vehicle is driven by a gasoline or diesel engine, or the power supply to the electric motor, if the vehicle is an electric motor vehicle. For the purpose of the invention, the term "automatic drive control" refers to the operation of regulating the running speed of the motor vehicle, for example, to make the vehicle run at a constant speed and/or follow a target vehicle by constantly maintaining a given distance separating the target vehicle and the following vehicle.

For the purpose of the invention, the term "a consistent drivable mode" refers to a mode of operation of the motor vehicle where it is determinable that the drive power of the motor is greater than the running resistance of the vehicle and the ambiguous zone where the drivable mode is undiscriminable from the undrivable mode is excluded. Likewise, the term "a consistent undrivable mode" refers to a mode of operation of the motor vehicle where it is determinable that the drive power of the motor is smaller than the running resistance of the vehicle and the ambiguous zone where the drivable mode and the undrivable mode cannot be discriminated from each other is excluded.

For the purpose of the invention, the expression "to maintain a consistent mode" means that either a consistent drivable mode or a consistent undrivable mode is maintained during a gear shifting operation. For this purpose, the mode preceding the gear shifting operation may be maintained or, alternatively, the driving mode may be changed immediately before a gear shifting operation and the mode after the change may be maintained. Still alternatively, a unique consistent mode (a consistent undrivable mode for instance) may always be selected for gear shifting operations. The present invention need not be applied to all gear shifting operations. For example, it may be applied only to downward gear shifting operations or it may only be applied to shifting operations between selected gears.

According to the present invention, when the automatic transmission of a motor vehicle shifts gears while the vehicle is running under automatic drive control, the controller regulates the power output of the motor to maintain either a consistent drivable mode or a consistent undrivable mode. Thus, the mode of operation of the motor is maintained either to the drivable mode or to the undrivable mode when the automatic transmission shifts gears and never goes into the ambiguous zone so that it always controls gear shifting operations optimally in accordance with the state of operation of the motor. Therefore, the gear shifting operation of the automatic transmission is always adapted to the state of operation of the motor. In other words, any impact due to a gear shifting operation in an inappropriate mode is effectively avoided, thereby improving driver comfort when the motor vehicle is running under automatic drive control.

Preferably, a motor vehicle drive system controller according to the invention controls the power output of the motor so as to maintain a consistent undrivable mode when the automatic transmission downwardly shifts gears while the vehicle is running under automatic drive control. With this arrangement, the motor vehicle drive system controller always sticks to the consistent undrivable mode for downward gear shifting operations. This can be achieved by bringing the power output of the motor down to a sufficiently low level. The motor vehicle drive system controller does not have to then detect if the motor is operating in a drivable mode or in a undrivable mode and can suppress any impact due to a gear shifting operation in a simple manner.

Preferably, a motor vehicle drive system controller according to the invention detects the mode of operation of the motor immediately before a gear shifting operation and controls the motor so as to make it maintain the detected mode, which is either a consistent drivable mode or a consistent undrivable mode, throughout the gear shifting operation. Thus, since the detected mode is maintained throughout the subsequent gear shifting operation, gear shifting operation causes no impact to the driver. Note, however, that in an ambiguous zone neither a consistent drivable mode nor a consistent undrivable mode may be detected. In such is the case, the motor vehicle drive system controller preferably controls the motor to operate consistently in either one of the modes.

Preferably, if a motor vehicle drive system controller according to the invention detects that the motor vehicle is running in a consistent drivable mode immediately before a downward gear shifting operation, it so controls the power output of the motor as to maintain the consistent drivable mode throughout the gear shifting operation.

Another object of the present invention is to provide an automatic drive controller that can adapt itself to any abnormal condition of the automatic transmission with simple control procedures if such an abnormal condition occurs. According to the invention, the above object is achieved by providing an automatic drive controller for controlling the running speed of a motor vehicle according to the inter-vehicular distance between the motor vehicle and an object found in front of the motor vehicle, wherein the transmission of the motor vehicle is one of the objects controlled by the controller, and comprises means for prohibiting automatic drive control operation when it detects an abnormality in the transmission.

For the purpose of the invention, the term "regulating the running speed of a motor vehicle" includes accelerating, decelerating or maintaining the current running speed of the motor vehicle. The transmission may constitute a single and unique component of the motor vehicle to be controlled by the automatic drive controller. Alternatively, the motive power source (engine or electric motor whichever appropriate), the braking system of the motor vehicle and/or other components may be controlled by the automatic drive controller in addition to the transmission. While the transmission is preferably an automatic transmission, the present invention is applicable to an manual transmission provided with a transmission mechanism that does not rely on the driver's operation. The present invention is also applicable to an automatic transmission that allows the use of a mode of operation where the driver can shift gears (sometimes called a "sports mode").

For the purpose of the invention, "an abnormal condition in the transmission" means a condition where the operation of regulating the running speed of the motor vehicle (which may be a gear shifting operation, a braking operation or a locking-up operation) cannot be conducted properly and includes a failed solenoid in the hydraulic control unit.

Thus, an automatic drive controller according to the invention can significantly simplify the operation of dealing with an abnormal condition detected in the transmission because the use of the automatic drive controller is prohibited. For example, complex control procedures will be required if an abnormal condition detected in the automatic transmission is to be dealt with by controlling the motor.

An automatic drive controller for controlling the running speed of a motor vehicle according to the inter-vehicular distance between the motor vehicle and an object found in front of the motor vehicle, wherein the transmission of the motor vehicle as one of the objects controlled by the controller, and the controller comprises means for notifying the driver that the automatic drive control is inoperative when it detects an abnormality in the transmission.

After being notified of the fact that the automatic drive controller is no longer usable the driver operates the motor vehicle without using the automatic drive controller. Thus, the abnormal condition of the automatic drive controller can be dealt with without providing complex control means for dealing with such a condition. In this invention, both means for prohibiting the use of said automatic drive controller as described and means for notifying the driver of an abnormal condition may be provided.

Thus, according to the invention, any abnormal condition in the transmission can be dealt with without requiring the use of complex control means.

BRIEF DESCRIPTION OF THE DRAWINGS

FIG. 4 is a chart illustrating the operation of the frictionally engaging members in gear shifting operations of the automatic transmission of FIG. 3.

FIG. 13 is a chart illustrating the operation of the frictionally engaging members in gear shifting operations of the automatic transmission of FIG. 12.

DESCRIPTION OF THE PREFERRED EMBODIMENTS

Embodiment 1

The present invention will next be described by referring to the accompanying drawings that illustrate preferred embodiments of motor vehicle drive system controller according to the invention. Note that the motor vehicles in the following description are equipped with a gasoline engine as the motive power source. In the following description, the term "cruise control" refers to automatic drive controls.

Figure 5:
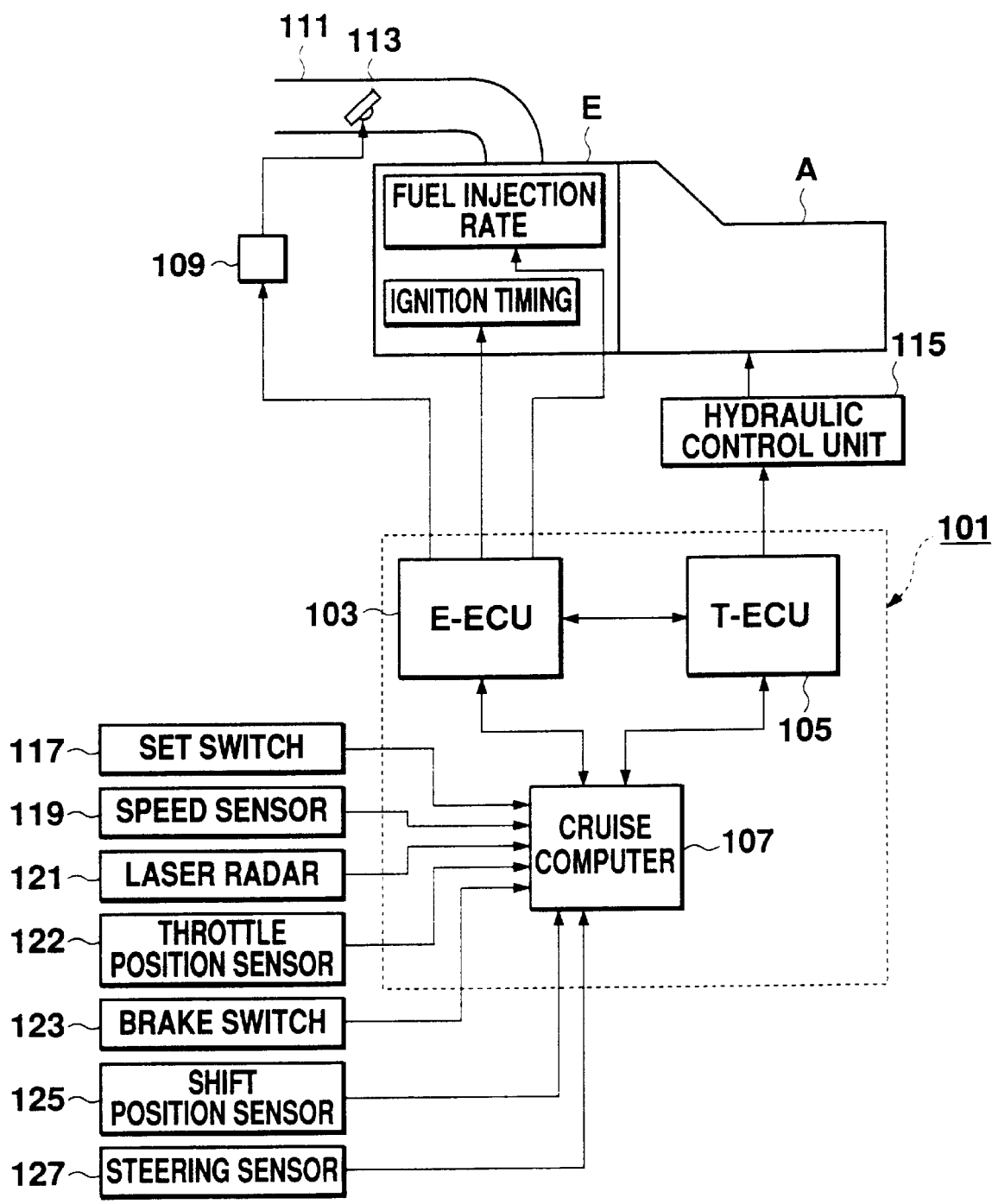
FIG. 5 is a schematic block diagram of a first embodiment of a motor vehicle drive system controller according to this invention.

FIG. 5 is a schematic block diagram showing a motor vehicle drive system controller according to a first embodiment of invention, showing the configuration of the motor vehicle drive system controller 101. As shown, the motor vehicle drive system controller 101 comprises an electronic control for the engine (hereinafter referred to as E-ECU) 103, an electronic control for the automatic transmission (hereinafter referred to as T-ECU) 105, and a cruise computer 107 provided for controlling the engine E and the automatic transmission A. Each of the above listed electronic controls comprises as principal components a central processing unit (CPU), memories (including RAMs and ROMs), and an input/output interface. The electronic controls may be arranged as independent devices or integrally formed as a single device.

The E-ECU 103 receives, as input control data, data including that on the number of revolutions per minutes of the engine, the rate of air intake, the air intake temperature, the throttle position, the running speed of the motor vehicle, the temperature of the engine cooling water, as well as signals from the brake switch and control data coming from the T-ECU 105. The E-ECU 103 determines a value it issues as a command for the throttle position on the basis of the above input data and the value for the throttle position requested by the cruise computer 107. The E-ECU 103 then transmits a control signal for the value determined as a command for the throttle position to the throttle actuator 109. As the throttle actuator 109 is driven to operate according to the input signal, the electronic throttle 113 arranged in an air intake conduit 111 shows a position corresponding to the command for the throttle position. The E-ECU 103, on its own part, controls the rate of fuel injection and the timing of ignition of the engine E in a similar manner to regulate the power output of the engine E.

Figure 3:
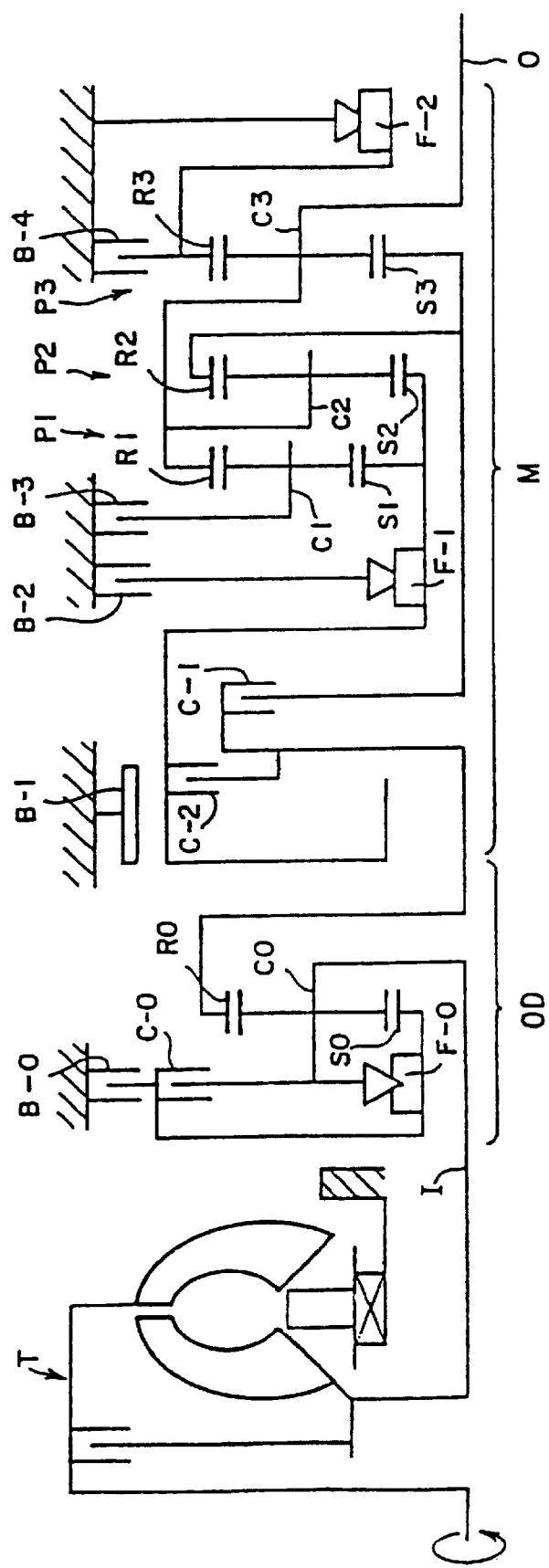
FIG. 3 is a schematic block diagram of a known automatic transmission.

The T-ECU 105 is designed to control gear shifting operations of the automatic transmission A. It receives, as input control data, data including that on the throttle position, the running speed of the motor vehicle, the temperature of the engine cooling water, signals from the brake switch, the gear shifting lever position, the rate of revolution of the clutch C0 of the auxiliary transmission OD as illustrated in FIG. 3, the oil temperature of the automatic transmission A, and the signal from the output torque sensor of the automatic transmission A, as well as the signal representing the control data from the E-ECU 103. The T-ECU 105 then produces a control signal for the hydraulic control unit 115 on the basis of the above input data and the signal requesting a gear shifting operation received from the cruise computer 107. The hydraulic control unit 115 comprises a plurality of solenoid valves and the frictionally engaging members of the automatic transmission A are driven for engaging/disengaging operations as the solenoid valves operate according to the input signals of the unit. Thus, gear shifting operations, operations for switching from use to non-use of the engine braking effect or vice versa, and lock-up operations are controlled for the motor vehicle according to the control signals transmitted from the T-ECU 105.

The cruise computer 107 has three major roles. First, it controls the running speed of the motor vehicle so as to make the vehicle move at a constant speed. Second, it controls the running speed of the motor vehicle so as to cause the vehicle to follow a target vehicle at a given inter-vehicular distance. Third, it controls the running speed of the motor vehicle so as to make the vehicle run with a constant interval preset by the driver between a leading vehicle and the driver's own vehicle. The cruise computer 107 receives a set signal from the set switch 117 operated by the driver. The set signal contains (1) data on commanding a cruise control operation to be started, (2) data indicating the preset running speed of the motor vehicle for running at a constant speed, (3) data on commanding the motor vehicle to run either as a follower or with a constant interval between a leading vehicle and itself, and (4) data on presetting a constant interval between a leading vehicle ad the driver's own vehicle. The cruise computer 107 also receives data on the running speed of the vehicle detected by the running speed sensor 119, data on the inter-vehicular distance between a leading vehicle and the driver's own vehicle detected by the laser radar 121 arranged at the front of the vehicle, data on the throttle opening detected by the throttle opening sensor 122, data on the brake on/off status detected by the brake switch 123, data on the gear shift position detected by the gear shift position sensor 125, data on the steering angle detected by the steering sensor 127 and other data. For the purpose of the invention, the laser radar 121 may be replaced by a millimeter wave radar, a microwave radar or a distance measuring instrument utilizing an image data processor.

The cruise computer 107 determines a target running speed of the motor vehicle and a value of acceleration or deceleration required for the vehicle and then determines a request value for the throttle opening, the necessity of shifting gears for achieving the target running speed, and the value of acceleration of deceleration required for the vehicle. Subsequently, the request value for the throttle opening is transmitted to the E-ECU 103, which in turn controls the power output of the engine according to the request value for the throttle opening. If there is a signal requesting a gear shifting operation, it is then transmitted to the T-ECU 105, which in turn controls the automatic transmission A to make the latter carry out a gear shifting operation according to the signal requesting a gear shifting operation. Note that the gear shifting operation may be so controlled as to exploit the braking effect of the engine. In this way the cruise computer 107 regulates the running speed of the motor vehicle.

The control procedures of the cruise computer 107 will next be described below in greater detail.

(1) If the laser radar detects no target vehicle or if the inter-vehicular distance with any foregoing vehicle exceeds a predetermined level, the motor vehicle is driven at a preset constant running speed.

(2) If the laser radar detects a leading vehicle, the motor vehicle is driven to follow it and the running speed of the vehicle is so regulated as to maintain a predetermined inter-vehicular distance. The inter-vehicular distance may typically be so determined that the inter-vehicular time (the time period required for the motor vehicle to run the inter-vehicular distance with the measured running speed) required for the running speed measured at any given point of time is maintained at a constant level. Generally, a follower vehicle must be accelerated and decelerated more frequently and more intensely than a vehicle running at a constant speed, and hence shifts gears more frequently than its counterpart running at a constant speed.

(3) The running speed of the motor vehicle is so controlled as to make the vehicle run with a constant inter-vehicular distance preset by the driver between a leading vehicle and the driver's own vehicle. In this case, again, the motor vehicle requires gear shifting operations more frequently that a vehicle running at a constant speed.

(4) If the laser radar no longer detects a leading vehicle while it is running as a follower or with a constant inter-vehicular distance, the vehicle is made to run at the constant speed once again by accelerating or decelerating from the running speed at the time when it loses the leading vehicle.

(5) A new vehicle may suddenly appear in front of the driver's motor vehicle while the driver's motor vehicle is running with a constant speed, following a leading vehicle or running with a constant inter-vehicular distance. The new vehicle may be a vehicle that changes its course from an adjacent lane to the lane of the driver's motor vehicle. In such a case, the motor vehicle is intensely decelerated to maintain a predetermined inter-vehicular distance through a gear shifting operation that involve the exploitation of the braking effect of the engine.

Now, some of the characteristic aspects of the operation of the above embodiment will be described. The cycle of control operation illustrated by the flow chart of FIG. 6 is repeated.

Figure 6:
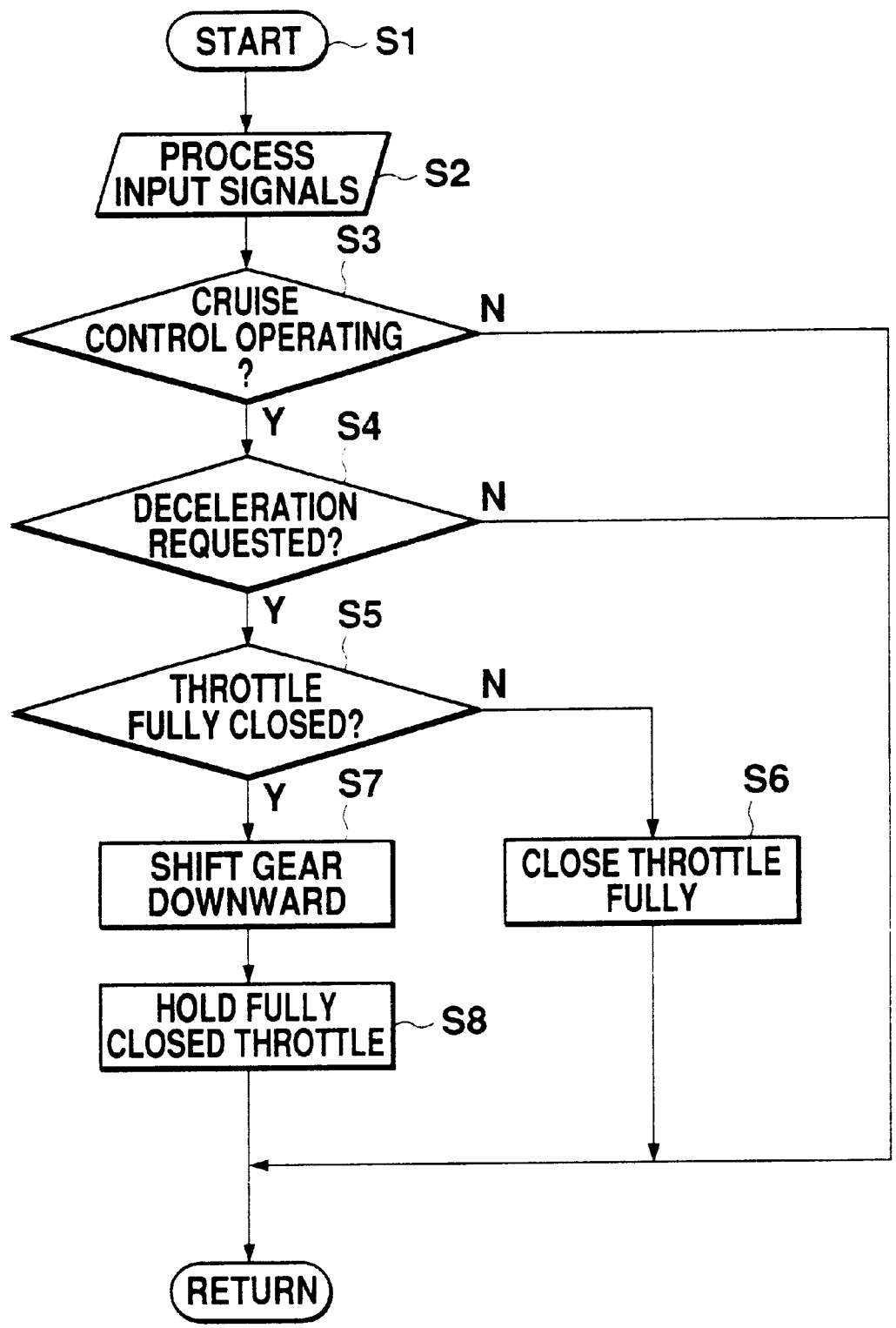
FIG. 6 is a flow chart illustrating the control operation of the first embodiment.

Referring to FIG. 6, as the cycle starts (S1), it processes signals transmitted from the various sensors as described earlier (S2) and then determines whether or not the motor vehicle is running under the control of the cruise computer (S3). If it is determined that the vehicle is running under the control of the cruise computer, it further determines whether or not the motor vehicle needs to be decelerated on the basis of the preset constant running speed and other preset values and on the actual running speed of the vehicle, the detected inter-vehicular distance and other values (S4).

If it is determined in Step S4 that the motor vehicle has to be decelerated, it subsequently determines if the throttle is completely closed or not on the basis of the detected throttle opening (S5). If the throttle is not completely closed, the E-ECU 103 operates to fully close the throttle valve (S6) and the operation of the drive system controller then returns to the starting point of the cycle. If the throttle has been fully closed when it is found that the motor vehicle must be decelerated, the answer to the question in Step S5 will be YES. If the throttle has not been fully closed when it is determined that the vehicle has to be decelerated, the operation of the embodiment goes back from Step S6 where the throttle is fully closed to Step S5 to get an answer of YES.

If the answer to the question in Step S5 is YES, then the T-ECU 105 carries out a downward gear shifting operation (S7). During this operation, the throttle is maintained in the fully closed condition (S8) and will not be allowed to open. The fully closed state of the throttle may continue after the downward gear shifting operation is complete. Alternatively, it may be so arranged that the throttle is released from the fully closed state when the downward gear shifting operation is completed in order to regulate the deceleration of the motor vehicle by controlling the throttle opening.

Figure 1:
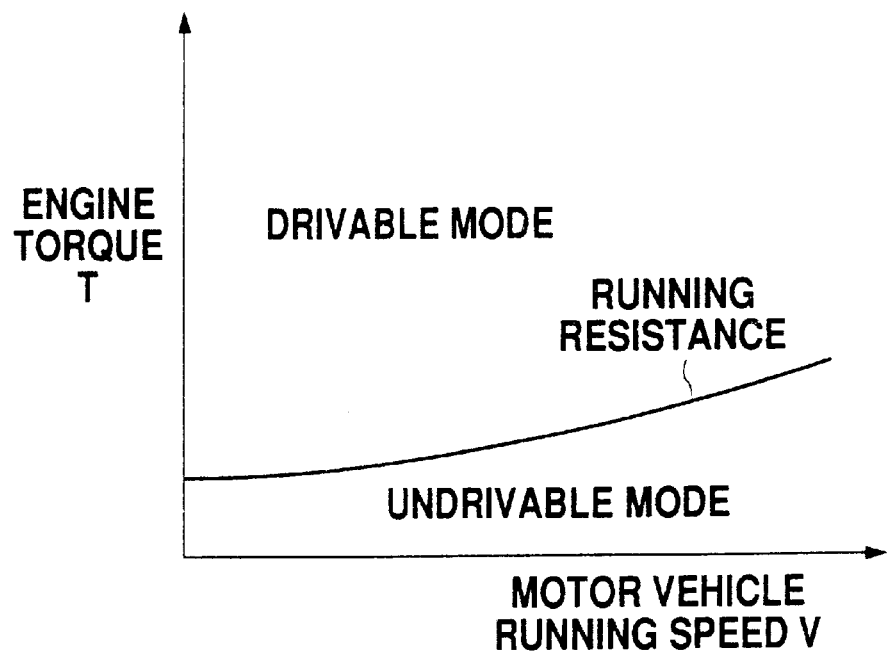
FIG. 1 is a graph illustrating the relationship between the engine torque to be controlled by a known drive system controller and the running speed of a motor vehicle indicating drivable and undrivable modes.
Figure 2:
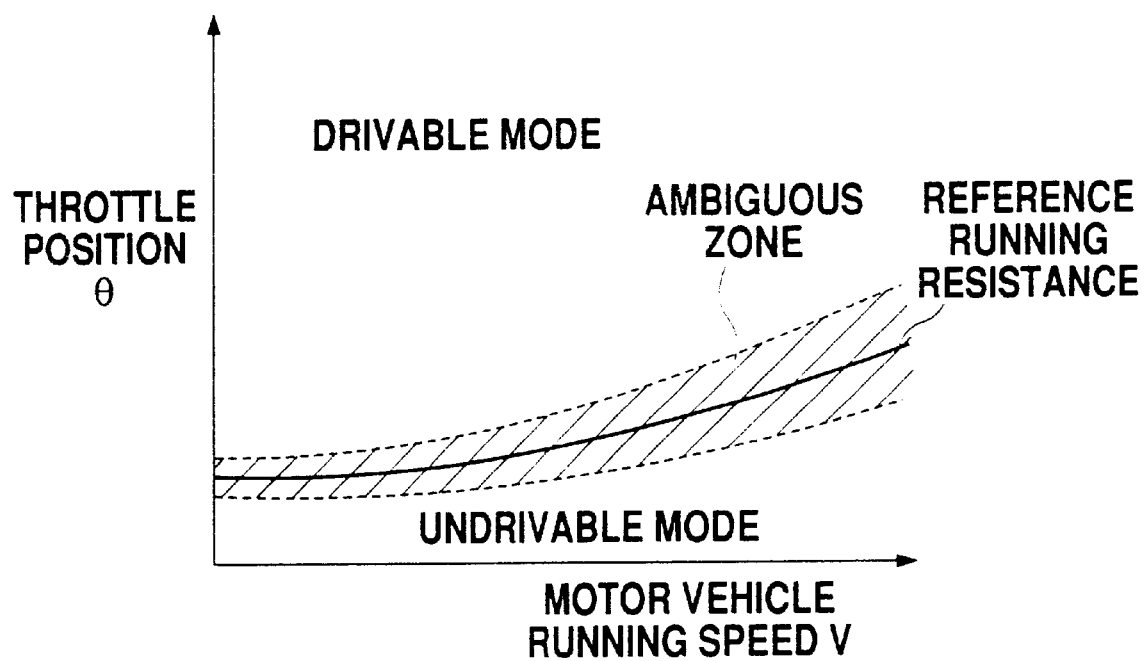
FIG. 2 is a graph similar to FIG. 1, but illustrating how a known drive system controller determines if the motor vehicle is running in a drivable mode or in an undrivable mode.

Thus, as described above, the throttle is held to a fully closed state during the downward gear shifting operation. Therefore, as seen from FIG. 2, the automatic transmission is securely held in an undrivable mode. In other words, the automatic transmission A operates in line with the undrivable mode during the downward gear shifting operation in Step S7 by adapting itself to a state where the drive power of the engine is smaller than the running resistance.

The above embodiment may be so modified that the above cycle of control operation proceeds not with a fully closed throttle but with a throttle that is opened to an extent less than a predetermined level. In such a case, the throttle may be so controlled that it is opened to an extent securely found under the ambiguous zone in FIG. 2. Also, with this arrangement, the automatic transmission is constantly held to an undrivable mode during the downward gear shifting operation and thus the automatic transmission operates in line with the undrivable mode in Step S7.

The downward gear shifting operation in Step S7 may be a single step or plural step gear shifting depending on the required degree of deceleration. Note that these modifications are applicable to the second embodiment that will be described hereinafter.

The above described embodiment may also be so modified that the controller controls the throttle opening as in FIG. 6 for only some of the three modes of running of the motor vehicle: the mode of running at a constant speed, that of following a target vehicle, and that of running with an inter-vehicular distance between a leading vehicle and itself. This modification can be easily realized by altering the conditions to be met in Step S3 and/or Step S4. This modification is also applicable to the following second embodiment.

Embodiment 2

The overall configuration of this embodiment of drive system controller according to the invention is similar to that of the first embodiment described above and, therefore, its description will not be repeated.

Figure 7:
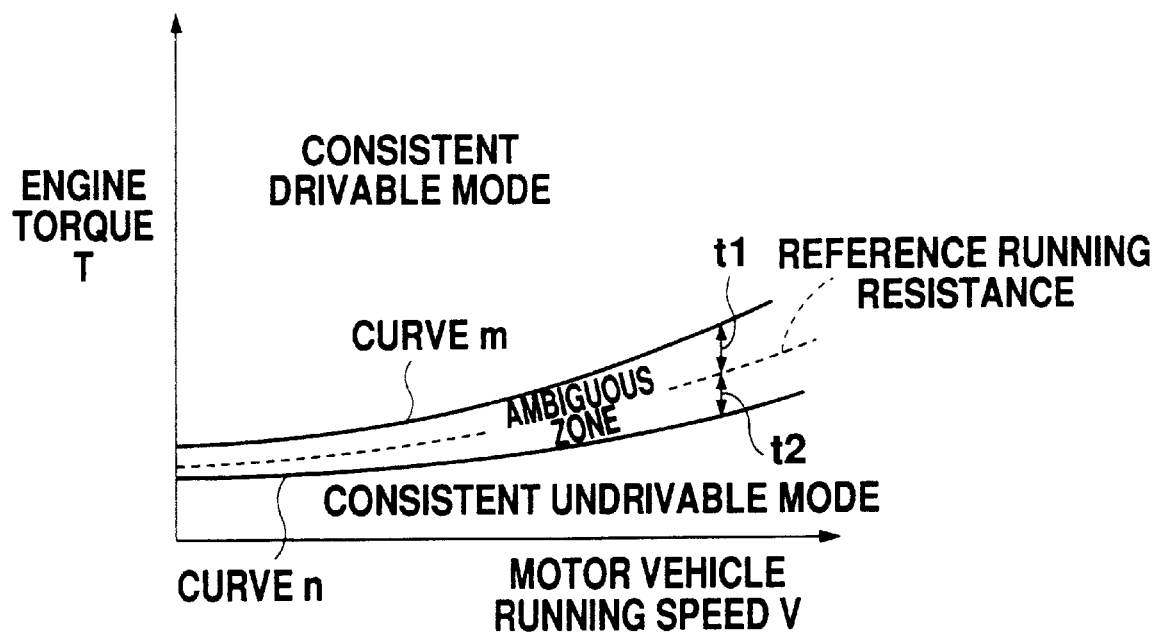
FIG. 7 is a graph illustrating the relationship between motor vehicle running speed and engine torque to be controlled by a drive system controller according to a second embodiment of the invention indicating consistent drivable and consistent undrivable modes.

As shown in FIG. 7, the running speed v of the motor vehicle and the engine torque T define an ambiguous zone in addition to a consistent drivable mode and a consistent undrivable mode for this embodiment. In FIG. 7, the curves m and n respectively represent the upper and lower limits of running resistance expected under normal running conditions of the motor vehicle.

(1) consistent drivable mode: This represents a state where the engine torque T of the motor vehicle is found above the curve m and the drive power exceeds with certainty the running resistance.

(2) consistent undrivable mode: This represents a state where the engine torque T of the motor vehicle is found under the curve n and the drive power falls with certainty under the running resistance.

(3) ambiguous zone: This represents a state where the engine torque T of the motor vehicle is under the curve m and above the curve n. Since the running resistance fluctuates in this zone, it is not possible to clearly determine which of the drive power of the motor vehicle detected on the basis of the engine torque T and the running resistance is greater. In other words, it is not possible to clearly determine whether the automatic transmission is operating in a drivable mode or in an undrivable mode.

The curves m and n may be defined typically in a manner as described below. First, the running resistance of the motor vehicle typically found on a flat road is defined as a reference running resistance as indicated by the broken line in FIG. 7. Then, an increment t1 and a decrement t2 of the running resistance due to the normally expected gradient of the road and the fluctuations in the road conditions are selected. Next, the curve m is obtained by adding t1 to the reference running resistance for each running speed and the curve n is obtained by subtracting t2 from the reference running resistance.

Figure 8:
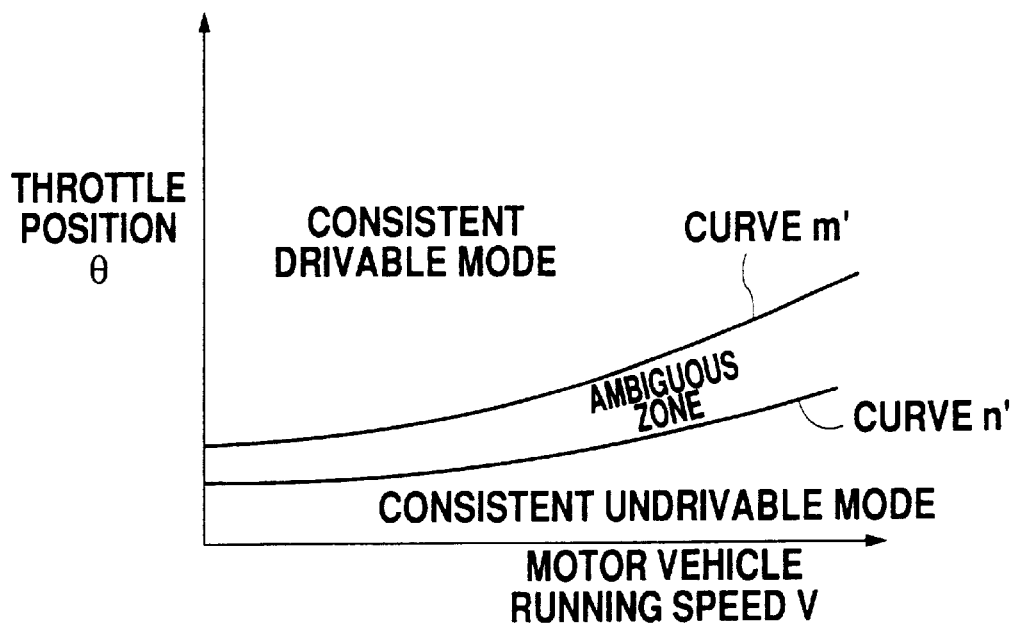
FIG. 8 is a graph showing the relationship between motor vehicle running speed and throttle opening to be controlled by the drive system controller of the second embodiment indicating consistent drivable and consistent undrivable modes.

In FIG. 8, the engine torque T is converted to the throttle position θ and the curves m' and n' in FIG. 8 correspond respectively to the curves m and n in FIG. 7. In this embodiment, the throttle position θ is controlled by referring to a map as shown in FIG. 8.

Figure 8A:
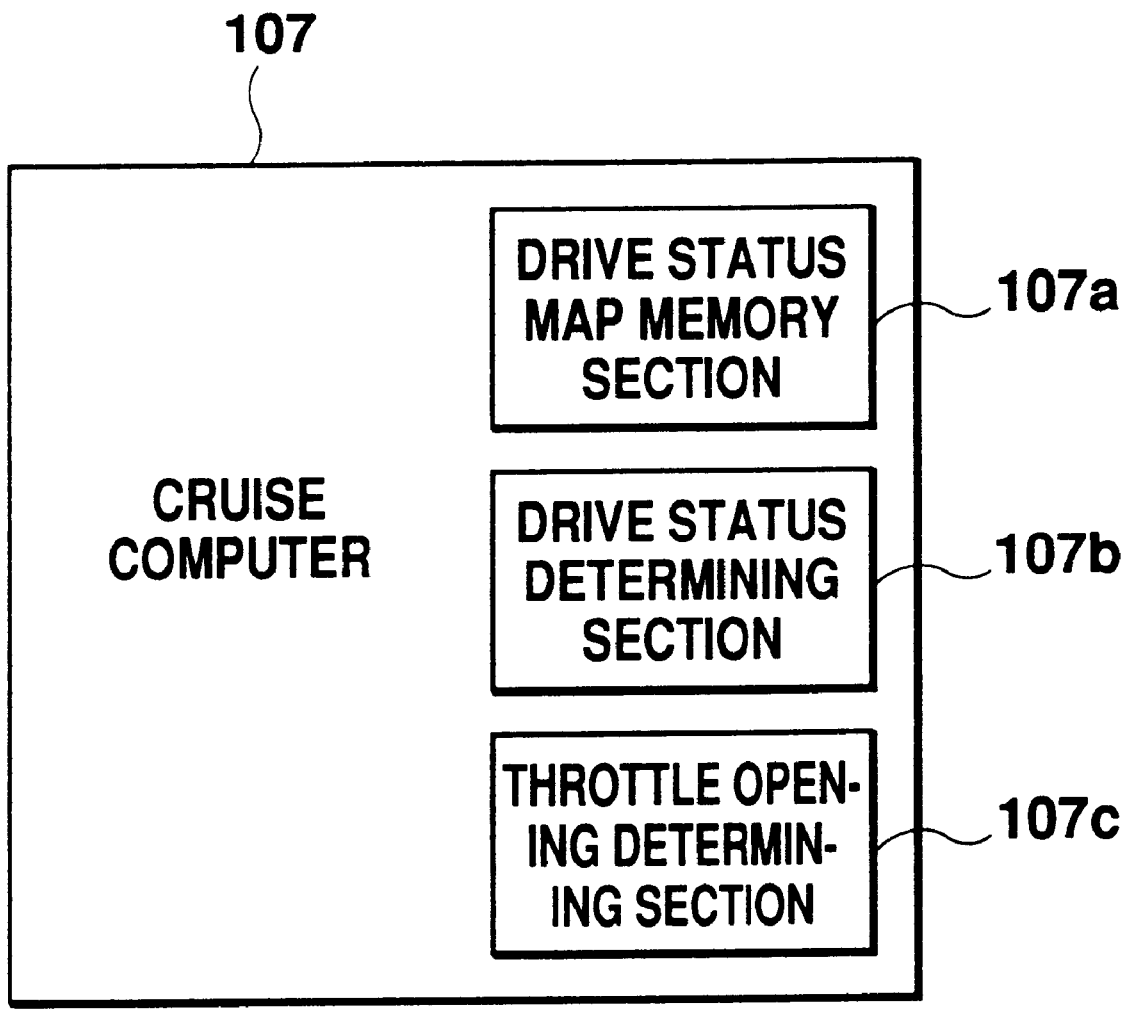
FIG. 8A is a schematic block diagram of a cruise computer comprising a map storage for storing the map shown in FIG. 8.

Referring to FIG. 8A, the cruise computer 107 of this embodiment comprises a drive status map memory 107a for storing a drive status map as shown in FIG. 8 and a drive status determining section 107b for determining the drive status of the motor vehicle referring to this map. The throttle position determining section 107c of the cruise computer 107 determines the throttle position of the engine of the motor vehicle running under the control of the automatic drive controller. More specifically, the throttle position determining section 107c determines the throttle position during a downward gear shifting operation by referring to the output of the drive status determining section 107b. A signal representing the determined throttle opening is then transmitted to the E-ECU 103.

Characteristic aspects of the control operation of this embodiment will be described below in greater detail, repeating the cycle of control operation illustrated by the flow chart of FIG. 9.

Figure 9:
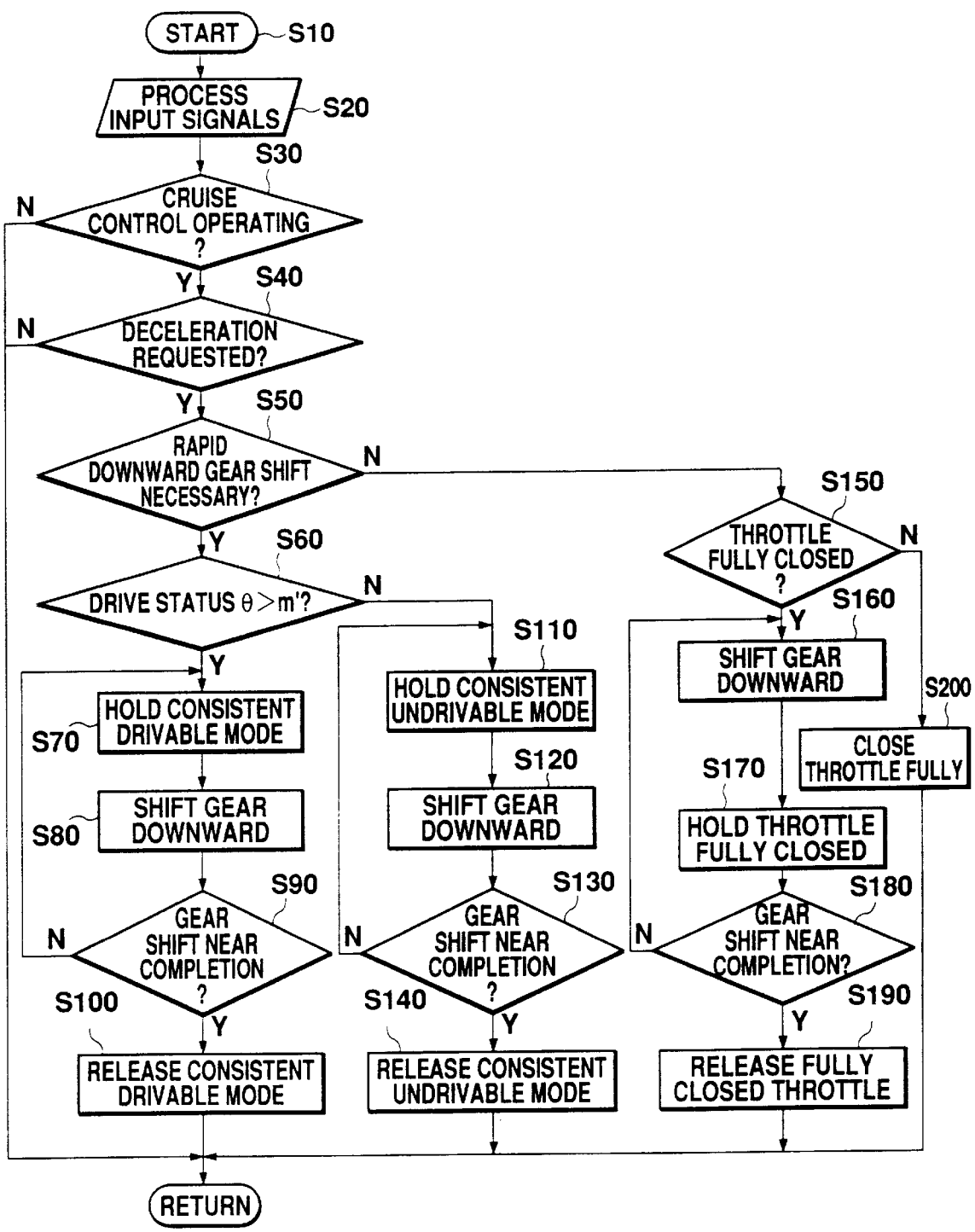
FIG. 9 is a flow chart of the control operation of the second embodiment.

Referring to FIG. 9, as the cycle begins (S10), it processes the signals transmitted from the various sensors as described earlier (S20) and then determines whether or not the motor vehicle is running under the control of the cruise computer (S30). When it is determined that the vehicle is running under the control of the cruise computer, it further determines whether or not the motor vehicle needs to be decelerated on the basis of the preset constant running speed and other preset values, the actual running speed of the vehicle, the detected inter-vehicular distance, and other values (S40).

If it is determined in Step S40 that the motor vehicle must be decelerated, the controller subsequently determines if a quick downward gear shifting operation is necessary or not (S50). More specifically, the cruise computer 107 determines the necessary deceleration according to the input signal and compares the necessary deceleration with a reference value obtained according to the motor vehicle speed and the gear that is currently in operation. The reference value is set to a level attainable by regulating the throttle position. If the necessary deceleration is greater than the reference value (YES), the drive system controller determines that a quick downward gear shifting operation is required to create the engine braking effect.

If the answer in Step S50 is YES, the drive system controller determines the drive status of the motor vehicle by referring to the map of FIG. 8 and the values detected for the running speed v and the throttle position θ (S60). The answer will be YES if the throttle position θ is found above the curve m' in FIG. 8 (and hence the vehicle is running in a consistent drivable mode), whereas the answer will be NO if the throttle position θ is found below the curve m' (and hence the vehicle is running not in a consistent drivable mode but in the ambiguous zone or in a consistent undrivable mode).

If the answer in Step S60 is YES, the drive system controller controls the throttle position in such a way that the consistent drivable mode is continued (S70). In other words, a signal requesting a throttle opening greater than the curve m' of FIG. 8 is transmitted to the E-ECU 103, which then drives the throttle actuator 109 according to the signal. The drive system controller may also maintain the current throttle position. Thereafter, it transmits a control signal demanding a downward gear shifting operation to the T-ECU 105, which then carries out a downward gear shifting operation good for the drivable mode (S80). In other words, the automatic transmission operates in harmony with the drivable mode by adapting itself to a state where the drive power of the engine is greater than the running resistance. Then, either the cruise computer 107 or the T-ECU 105 determines if the motor vehicle has entered a state shortly before the completion of the gear shifting operation (S90). The drive system controller returns to Step S70 to continue the consistent drivable mode if the answer is NO in Step S90 and releases the drive status of being held to the consistent drivable mode (S100) and returns to the starting point of the cycle if the answer is YES in Step S90.

If the answer in Step S60 is NO, it means that the throttle position θ is found below the curve m' of FIG. 8 and the drive status is in the ambiguous zone or in a consistent undrivable mode. Under this condition, the drive system controller controls the throttle position θ in such a way that the consistent undrivable mode is achieved (S110) and the throttle position is controlled to be below the curve n' of FIG. 8. In other words, if the throttle position θ must be reduced when it is in the ambiguous zone. The drive system controller then transmits a control signal to the T-ECU 105, demanding a downward gear shifting operation, and the T-ECU 105, on its part, carries out a downward gear shifting operation in a manner suitable for an undrivable mode (S120). Next, either the cruise computer 107 or the T-ECU 105 determines as in Step S90 if the motor vehicle has achieved a state shortly before the completion of the gear shifting operation (S130). The drive system controller returns to Step S110 to continue the consistent undrivable mode if the answer is NO in Step S130 and releases the drive status of being held to the consistent undrivable mode (S140) and returns to the starting point of the cycle if the answer in Step S130 is YES.

If, on the other hand, it is determined in Step S50 that a quick downward gear shifting operation is not necessary, the drive system controller determines if the throttle is fully closed or not (S150). If the answer in Step S150 is YES, the motor vehicle cannot be further decelerated by regulating the throttle position. Therefore, it carries out a downward gear shifting operation to meet the requirement of deceleration (S160) in harmony with the undrivable mode. The throttle is maintained in the fully closed state as described earlier for Step S8 of the first embodiment (S170) and subsequently it is determined if the gear shifting operation is terminating or not as in Step S90 (S180). If the answer in Step S180 is NO, the drive system controller returns to Step S160. If the answer is YES, on the other hand, the throttle is released from its fully closed state (S190).

If it is determined in Step S150 that the throttle is not fully closed, an operation of fully closing the throttle is conducted to decelerate the motor vehicle by regulating the throttle (S200).

The operation of the drive system controller will now be described in terms of specific cases.

(1) The motor vehicle is running in a consistent drivable mode and must be decelerated but no quick deceleration is necessary (as in a case where the motor vehicle is running at a constant speed and begins down slope after running on a flat road).

Since the requested degree of deceleration is low, it is determined in Step S50 that no quick deceleration is necessary. Then, in Steps S150 and S200, the drive system controller fully closes the throttle. If deceleration is further requested after returning to the starting point of the cycle, a downward gear shifting operation is conducted in Steps S150 and S160. A smooth deceleration is realized by first regulating the throttle opening to decelerate the motor vehicle.

(2) The motor vehicle is running in a consistent drivable mode and a quick deceleration becomes necessary (as in a case where the motor vehicle is following a target vehicle and abruptly a new vehicle to intervene).

Since a large degree of deceleration is required, it is determined in Step S50 that a quick deceleration is necessary and a downward gear shifting operation is performed in Steps S70 and S80, maintaining the consistent undrivable mode. An additional quick downward gear shifting operation will be carried out after returning to the starting point of the cycle if such an operation is required. If, on the other hand, no further quick downward gear shifting operation is required, the drive system controller proceeds to Step S150 and continues processing operations from there. Thus, if it is obvious that the requirement of deceleration is not met simply by regulating the throttle opening while maintaining the currently selected gear, the downward gear shifting operation is so controlled as to step down to a gear that can realize the braking effect of the engine and the required extent of deceleration.

In the above described embodiment, a downward gear shifting operation can be realized only in the following three ways: (1) a downward gear shifting operation corresponding to the consistent drivable mode that is currently maintained (Step S80), (2) a downward gear shifting operation corresponding to the consistent undrivable mode that is currently maintained (Step S120) and (3) a downward gear shifting operation corresponding to the consistent undrivable mode while the throttle is in a fully closed state (a state that belongs to the consistent undrivable mode) (Step S160). Therefore, no downward gear shifting operation occurs in the ambiguous zone. Furthermore, a downward gear shifting operation corresponding to an undrivable mode will never take place in a drivable mode and the opposite is also true. Still further, a mode change such as a change from a drivable mode to an undrivable mode will never occur during a downward gear shifting operation.

The above embodiment may also be modified in many different ways. While a consistent drivable mode and a consistent undrivable mode are defined in terms of the running speed of the motor vehicle and the throttle position of the engine in FIG. 7, they may be defined in terms of one or more than one factor (e.g., the gradient of the road) in addition to the running speed and the throttle opening. The ambiguous zone will be narrowed by using one or more additional factors.

Figure 10:
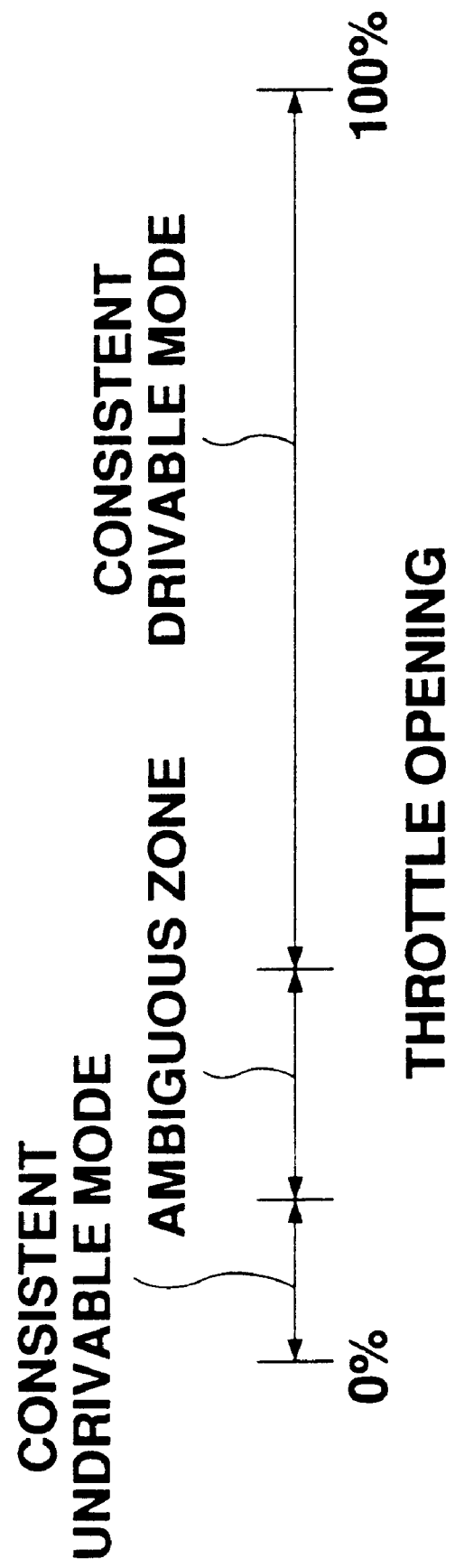
FIG. 10 is a graph illustrating a consistent drivable mode and a consistent undrivable mode defined only in terms of the throttle opening.

On the other hand, a consistent drivable mode and a consistent undrivable mode may be defined in terms of only the throttle opening of the engine. FIG. 10 illustrates such a definition. Then, the control operation of the drive system controller is significantly simplified because the running speed need not be taken into consideration.

Although a narrow ambiguous zone is defined in FIG. 7 by using the curves m and n respectively for the upper and lower limits of the running resistance, a broader ambiguous zone may be used for the purpose of the invention without giving rise to any problems.

Embodiment 3

Figure 11:
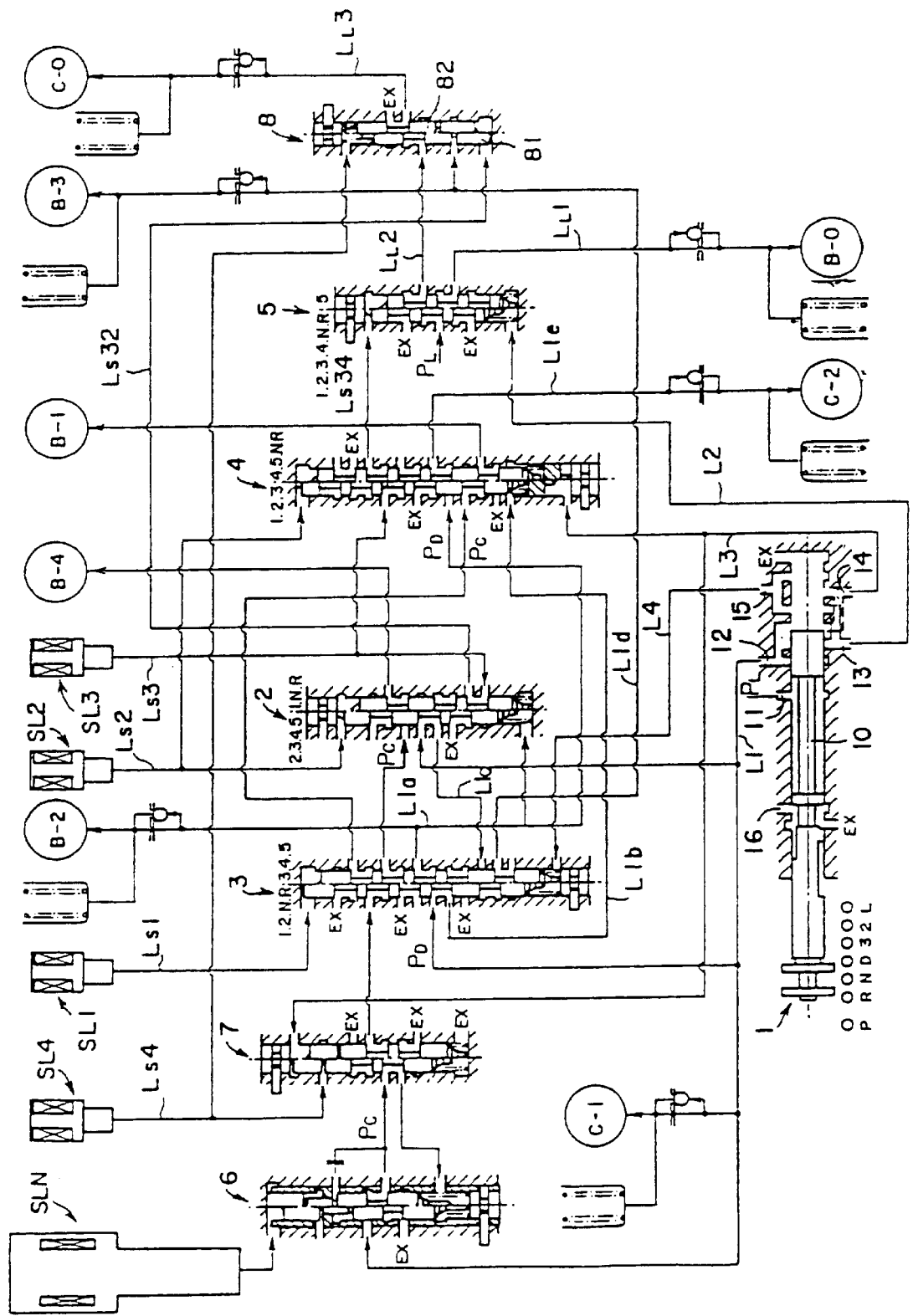
FIG. 11 is a schematic circuit diagram of the transmission circuit section of a hydraulic control unit arranged in an automatic transmission that can constitute an object to be controlled by a third embodiment of the invention, which is an automatic drive controller.

This embodiment will be described hereinafter in terms of (1) "the automatic transmission as an object of control of an automatic drive controller", (2) "the configuration of an automatic drive controller", (3) "automatic drive control" and (4) "the control operations characteristic to the invention". (1) The automatic transmission as an object of control of an automatic drive controller FIGS. 11 through 15 schematically illustrate the configuration of an automatic transmission that is an object of control of an automatic drive controller according to the present invention. The automatic transmission includes a 5-step transmission gear mechanism and a hydraulic control unit for controlling the operation of the gear mechanism, of which the transmission gear mechanism comprises an auxiliary transmission OD including a front overdrive planetary gear unit (hereinafter referred to as gear unit) OD in combination with a main transmission M for 4-step forward drive and 1-step rearward drive including a simply linked train of three planetary gears. The hydraulic control unit has a transmission circuit section having a circuit configuration as illustrated in FIG. 11.

Figure 12:
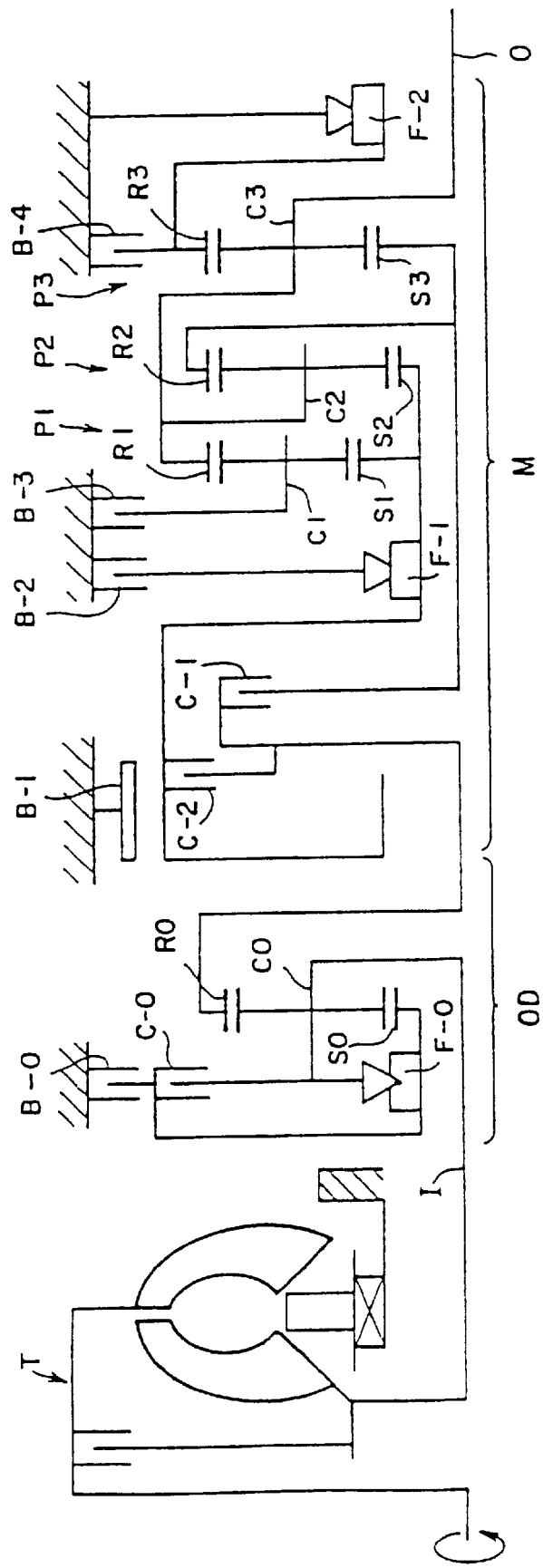
FIG. 12 is a schematic block diagram of an automatic transmission that can constitute an object to be controlled by the automatic drive controller of the third embodiment.

Referring now to FIG. 12, the automatic transmission comprises, in addition to the auxiliary transmission OD and the main transmission M as listed above, a torque converter T having a lock-up clutch. The auxiliary transmission OD is provided with a first one-way clutch F-0 and a multi-disc clutch C-0 arranged in parallel and associated with a sun gear S0, a carrier C0 and a ring gear R0, along with a multi-disc brake B-0 connected in series with the first one-way clutch C-0. The main transmission M comprises three sets of simply linked planetary gear units P1, P2 and P3 realized by appropriately and directly connecting various transmission elements including sun gears S1–S3, carriers C1–C3 and ring gears R1–R3. There are also provided multi-disc clutches C-1, C-2, a band brake B-1, multi-disc brakes B-2 through B4, a one-way clutch F-1, and a second one-way clutch F-2 in association with the transmission elements of each of the gear units. Additionally, each of the clutches and the brakes is provided with a servo system (not shown) controlled by means of servo hydraulic pressure having a piston for engaging/disengaging its frictional members.

With the above described automatic transmission, the rotary power input of the engine (not shown) is transmitted to the input shaft I of the auxiliary transmission OD. The rotary motion of the input shaft I is transmitted to the sun gear S3 of the gear unit P3 when the clutch C-0 is engaged to fix the auxiliary transmission OD, the clutch C-1 of the main transmission M is engaged, and all the remaining frictionally engaging members are disengaged. The rotary motion is then transmitted to the output shaft O as a low (1st) gear rotary motion by way of the carrier C3 due to the anti-reversing effect of the ring gear R3 created by the one-way clutch F-2. It will be understood that the reverse power transmission path is disrupted to remove the braking effect of the engine as the one-way clutch F-2 is released when the vehicle is driven to run by the axle (and hence in an undrivable mode) under this condition. However, the braking effect of the engine is resumed as the brake B-4 is engaged according to the range selection.

A second gear rotary motion is produced when the auxiliary transmission OD is directly linked and the clutch C-1 and the brake B-3 are engaged. The power input applied to the ring gear R2 of the gear unit P2 is then transmitted to the carrier C2 of the gear unit P2 and the ring gear R1 of the gear unit P1 directly linked thereto, using the carrier C1 of the gear unit P1 as a reversing element. The same power transmission path is used in the opposite direction for reverse drive. The reverse drive power from the output shaft O is transmitted back to the engine through the same transmission path, passing through the input shaft I and the torque converter T, because the main transmission M of the transmission mechanism is not provided with a one-way clutch arranged in parallel with the second brake B-3. Thus, the braking effect of the engine for the second gear appears for all the ranges. In view of this fact, the automatic transmission releases the clutch C-0 of the auxiliary transmission OD and hence relieves the reverse drive power in the overdrive gear unit section to avoid the braking effect of the engine for the second gear as will be described hereinafter.

A third gear rotary motion is obtained when the auxiliary transmission OD is fixed, the clutch C-1 and the brake B-2 are engaged and all the remaining elements are disengaged. The power input applied to the ring gear R2 of the gear unit P2 is then transmitted to the carrier C2, using the sun gear S2 as a reversing element. It will be understood that the reverse power transmission path is disrupted to remove the braking effect of the engine as the one-way clutch F-1 is released when the vehicle is driven to run by the axle. However, the braking effect of the engine is resumed as the brake B-1 is engaged according to the range selection.

A fourth gear rotary motion is produced also when the auxiliary transmission OD is fixed, both the clutch C-1 and the clutch C-2 are engaged, and all the remaining elements are disengaged. The gear unit P2 is fixed to produce the rotary power input directly as power output because the rotary motion is transmitted to the ring gear R2 and the sun gear S2. The braking effect of the engine always appears for reverse drive.

A top (5th) gear rotary motion is obtained when the clutch C-0 is released and brake B-0 is engaged under the condition where the main transmission M is set for the fourth gear rotary motion. Then, the sun gear S0 is held stationary and the rotating speed increases at the auxiliary transmission OD. A reverse motion is achieved when the clutch C-2 and the brake B-4 are engaged and all the remaining elements are disengaged of the main transmission M while the auxiliary transmission OD is held to the above described state. Under this condition, the rotary power input applied to the sun gear S2 of the gear unit P2 is reversed by the carriers C2 and C3 of the gear units P2 and P3 and transmitted to the output shaft using the ring gear R3 as a reversing element.

FIG. 11 shows the circuit configuration of the transmission circuit section for controlling engagement and disengagement of each of the brakes and the clutches of the transmission mechanism. Referring to FIG. 11, there are provided a 1–2 shifting valve 2 for controlling charging and discharging of the control pressure PC applied onto the brake B-4 for producing the braking effect of the engine for the low gear, a 2–3 shifting valve 3 for controlling charging and discharging of the drive range pressure PD applied onto the brake B-2 for shifting to the third gear, a 3–4 shifting valve 4 for controlling charging and discharging of the control pressure PC applied onto the brake B-1 for producing the braking effect of the engine for the third gear and also the drive range pressure PD applied onto the clutch C-2 for shifting to the fourth and top gears, and a 4–5 shifting valve 5 for switching the supply of the line pressure PL from the brake B-0 to the clutch C-0 between the manual valve 1 for receiving the supply of the line pressure PL and the servo system for the above listed frictionally engaging members.

There are additionally provided a pressure control valve 6 for generating the control pressure PC by regulating the D-range pressure, a basic pressure, by means of an SLN signal pressure produced by the linear solenoid valve SLN which will be described hereinafter during a gear shifting operation (the expression "producing an SLN signal pressure" means generating a signal pressure by eliminating the drain), a relay valve 7 for producing the braking effect of the engine that controls charging and discharging the control pressure PC applied onto the 2–3 shifting valve by switching actions, a C-0 exhaust valve 8 that controls charging and discharging the line pressure PL applied onto the clutch C-0 by way of the 4–5 shifting valve 5 through switching actions, a solenoid valve SL2 for transferring the switching signal pressure to the 1–2 shifting valve 2, a solenoid valve 3 for transferring a switching signal pressure to the C-0 exhaust valve 8 by way of the 1–2 shifting valve 2, a solenoid valve SL4 for transferring a switching signal pressure also to the C-0 exhaust valve 8, and a linear solenoid valve SLN for transferring a signal pressure that regulates the pressure control valve 6. Note that all of the brakes except B-1 and B-4 and all of the clutches are provided with an accumulator.

The configuration and the function of each of the above listed components will next be described in greater detail. The manual valve 1 comprises a spool valve interlocked with a shifting lever (not shown) and the line pressure PL is fed to the valve 1 by way of the input port 11. The valve 1 causes the input port 11 communicate with each of the output ports in order to transfer the line pressure depending on the sliding position of the spool 10. The valve 1 is so designed that it produces the hydraulic pressure only through the D-range port 12 at position D, additionally through the 3-range port 13 at position 3, still additionally through the 2-range port 14 at position 2, still additionally through the L-range port 15 at position L and through the R-range port 16 at position R. It closes all the output ports at position N whereas it makes the input port 11 communicate with the drain port EX at position P. Then, the pressure control valve 6 comprises a spool and a plunger biased by a spring. The valve 6 receives the D-range pressure as input and regulates it by referring to the output signal of the linear solenoid valve SLN. The control pressure PC is fed to the 2–3 shifting valve 3 by way of the relay valve 7 for producing the braking effect of the engine.

The relay valve 7 for producing the braking effect of the engine is in fact a change-over valve that also comprises a spool and a plunger biased by a spring. The 2-range pressure is applied onto the plunger, while the signal pressure of the solenoid valve SL4 is applied onto the spool. The supply of the control pressure PC to the 2–3 shifting valve 3 by either one of the pressures is switched to the discharge of the control pressure PC to the valve given rise to by releasing the pressure or vice versa.

As explaining the 2–3 shifting valve 3 is in fact a change-over valve that also comprises a spool biased by a spring. Through the application of the signal pressure of the solenoid valve SL1 and the L-range pressure, the control pressure PC is supplied either to the 3–4 shifting valve 4 or to the 1–2 shifting valve 2 in a switched manner, whereas the D-range pressure is supplied either to the oil route L1a or to the oil route L1b also in a switched manner. Likewise, the oil routes L1c and L1d are made to communicate with each other and the drains are switched through the application of the above pressures.

The 1–2 shifting valve 2 is in fact a change-over valve that comprises a spool biased by a spring. Through the application of the signal pressure of the solenoid valve SL2 and the hydraulic pressure coming via the oil route L1a, the control pressure PC is either supplied to the brake B-4 or discharged therefrom in a switched manner, whereas the signal pressure of the solenoid valve SL3 is either supplied to the oil route LS32 or discharged therefrom, also in a switched manner.

The 3–4 shifting valve 4 is in fact a change-over valve that comprises a spool biased by a spring by way of a piston. Through the application of the signal pressure of the solenoid valve SL2 and the hydraulic pressure coming via the oil route L1b and the oil route L3, the signal pressure of the solenoid SL3 from the oil route Ls3 is either transferred to the 4–5 shifting valve 5 by way of the oil rout LS34 or interrupted in a switched manner. Likewise, the oil routes L1a and L1e are caused to communicate with each other and the control pressure PC is supplied to the brake B-1 or discharged therefrom, also in a switched manner.

The 4–5 shifting valve 5 is in fact a change-over valve that comprises a spool biased by a spring. Through the application of the signal pressure from the oil route LS34 and the hydraulic pressure coming via the oil route L2, the line pressure L1 is either supplied to the C-0 exhaust valve 8 or discharged therefrom and also supplied to the brake B-0 via the oil route LL1 or discharged therefrom in a switched manner.

The C-0 exhaust valve 8 is in fact a change-over valve that comprises a spool 82 and a plunger 81 biased by a spring. Through the application of the signal pressure of the solenoid valve SL4 via the oil route LS4, the signal pressure of the solenoid valve SL3 via the oil route LS32 and the hydraulic pressure coming via the oil route Lid, the line pressure PL coming via the 4–5 shifting valve 5 is either supplied to the clutch C-0 via the oil route LL3 or discharged therefrom in a switched manner.

In the hydraulic control unit having a configuration as described above, the line pressure PL is supplied to the clutch C-0 via the 4–5 shifting valve 5 and the C-0 exhaust valve 8 in the neutral position illustrated in FIG. 11, although the route via the manual valve 1 is cut off. Therefore, the hydraulic pressure of the clutch C-1 is drained. The lateral deviation of each of the valves from the center line in FIG. 11 indicates the limits of displacement for the corresponding spool.

Figure 13:
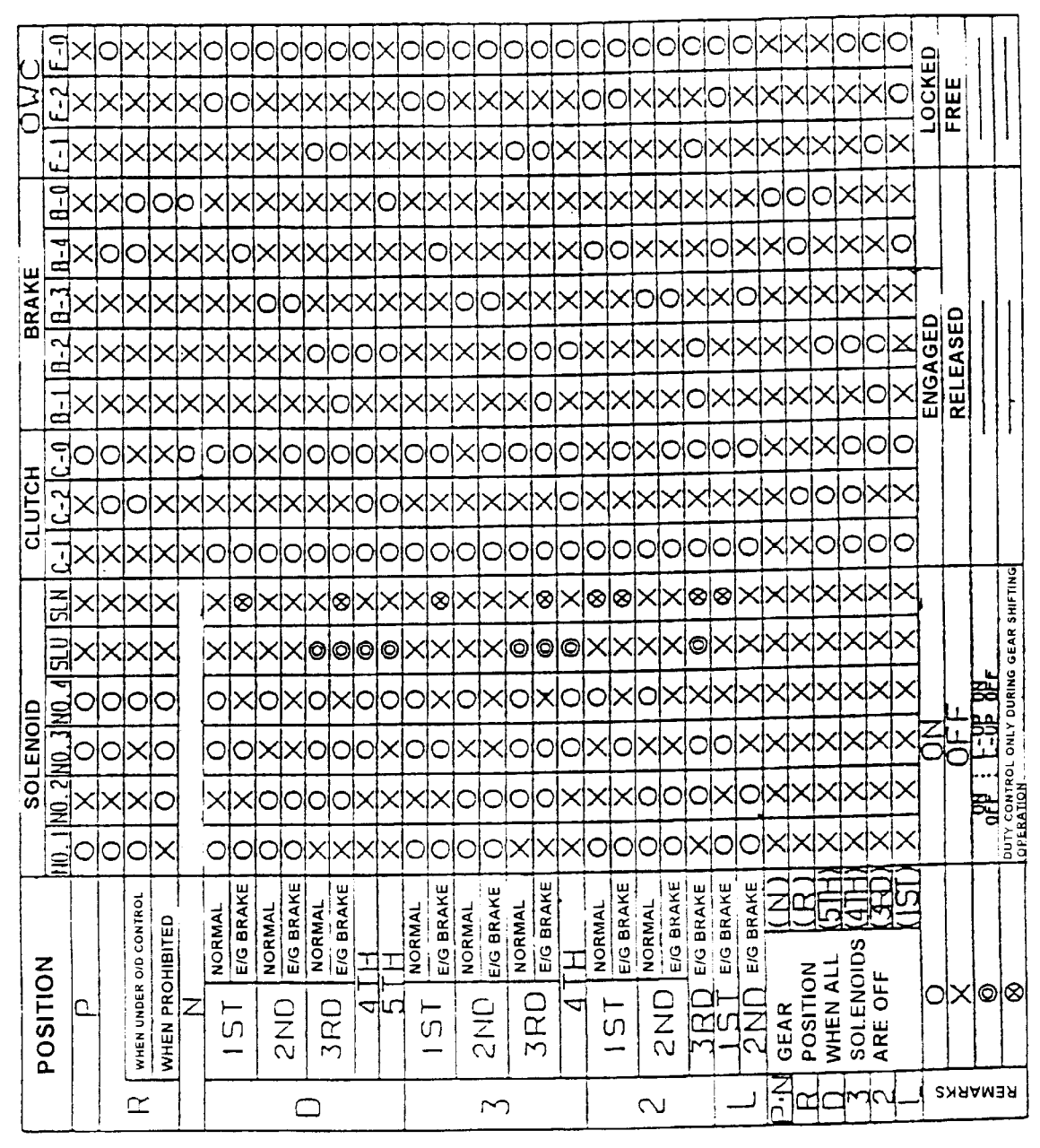

The hydraulic control unit performs electronic control operations according to the running speed and the engine load (typically expressed in terms of the throttle opening) according to the mechanically selected position of the manual valve 1, although the operations are not described in detail here. The range pressures are regulated and the solenoid valves SL1 through SL4 are turned on and off to control the clutches and the brakes of the transmission mechanism in a manner as shown in FIG. 13, as is the one-way clutch (abbreviated as OWC) is operated. In this way, the gear shifting operation is conducted and the braking effect of the engine (abbreviated as E/G) is produced in correspondence to the selected gear by applying the signal pressure of the solenoid valve SL4 (abbreviated as solenoid No. 4). With the above described automatic transmission, in particular, the braking effect of the engine of the gear corresponding to the position selected by the manual valve 1 is assured even when all the solenoid valves are turned off due a failure on the part of the electric signaling system (including the neutral start switch for position detecting and the solenoid valves themselves). More specifically, the braking effect of the engine for the low gear (abbreviated as 1ST) is guaranteed in the L-range and the braking effect for the third gear (abbreviated as 2ND) is guaranteed in the 2-range, whereas the braking effect for the fourth gear (abbreviated as 4TH) is guaranteed in the 3-range and the braking effect for the top gear (abbreviated as 5TH) is guaranteed in the D-range. In the chart of FIG. 13, O/D stands for overdrive and L-UP and SLU respectively stand for lock-up and the lock-up control valve.

In some of the ranges of the braking effect of the engine, in the 2-range in particular, of the transmission circuit of FIG. 11, the three ports 12 through 14 of the manual valve 1 are released and hydraulic pressure is supplied to the oil routes L1 through L3 connected to them. In the third gear position, the signal pressure is applied only onto the 2–3 shifting valve of each of the shifting valves as the solenoid valve SL1 is turned off so that the 2–3 shifting valve is displaced to the right in FIG. 11. The 2-range pressure from the 2-range port 14 is applied onto the plunger of the relay valve 7 for the braking effect of the engine so that the relay valve 7 is also displaced to the right in FIG. 11. On the other hand, the C-0 exhaust valve is displaced to the left in FIG. 11 is it is biased by the spring. Therefore, the line pressure PL is supplied from the oil route LL3 to the clutch C-0 by way of the 4–5 shifting valve 5, the oil route LL2 and the C-0 exhaust valve 8. The D-range pressure of the D-range port 12 is supplied to the clutch C-1 by way of the oil route L1. The control pressure PC is supplied to the brake B-1 via the oil route L1, the pressure control valve 6, the relay valve 7 for the braking effect of the engine, the 2–3 shifting valve 3 and the 3–4 shifting valve 4. Reaction force is supported by the brake B-1 and power is transmitted by the clutch C-1 as the clutch C-0 is engaged and the auxiliary transmission OD is directly linked. The braking effect of the engine can be produced even if the one-way clutch F-1 is released. The signal pressure of the solenoid valve SL3 is interrupted by the 1–2 shifting valve 2 and therefore not transferred to the oil route LS32. Thus, the clutch C-0 is not released, the braking effect of the engine is not lost.

When the second gear is selected, no solenoid valve signal pressure is applied to any of the shifting valves so that each valve is biased by the spring to the left half position as shown in FIG. 11. Under this condition, the signal pressure produced by turning off the second solenoid valve SL3 is cut off by the 1–2 shifting valve 2 and does not affect the gear shifting operation. The control pressure PC regulated by the pressure control valve 6 is supplied to the 1–2 shifting valve by way of the relay valve 7 for the braking effect of the engine that operates as the first change-over valve and the 2–3 shifting valve but cut off by these valves. Therefore, the control pressure PC does not take part in the gear shifting operation either. The pressure of the oil route L1 is supplied to the second brake B-3 by way of the 1–2 shifting valve 2, the oil route L1C, the 2–3 shifting valve 3 and the oil route L1d. On the other hand, the D-range pressure is directly supplied to the clutch C-1 from the oil route L1. Consequently, as described above, the gear shifting operation for selecting the second gear is achieved when the clutch C-1 and the second brake B-3 are engaged. Unlike the selection of the third gear, the pressure of the oil route L1d is applied onto the corresponding end of the spool 82 of the C-0 exhaust valve 8. When the signal pressure of the solenoid valve SL4 is not used as an output, the spool 82 resisting the spring load is displaced to the right half position of FIG. 11. As the line pressure PL to the clutch C-0 is cut off and the pressure being applied to the clutch C-0 is discharged, the braking effect of the engine is released. When the signal pressure of the solenoid valve SL4 is used as output, the spool 82 of the C-0 exhaust valve 8 is displaced by the spring load to the left half position of FIG. 11 and the clutch C-0 is engaged to make the braking effect of the engine available.

Figure 14:
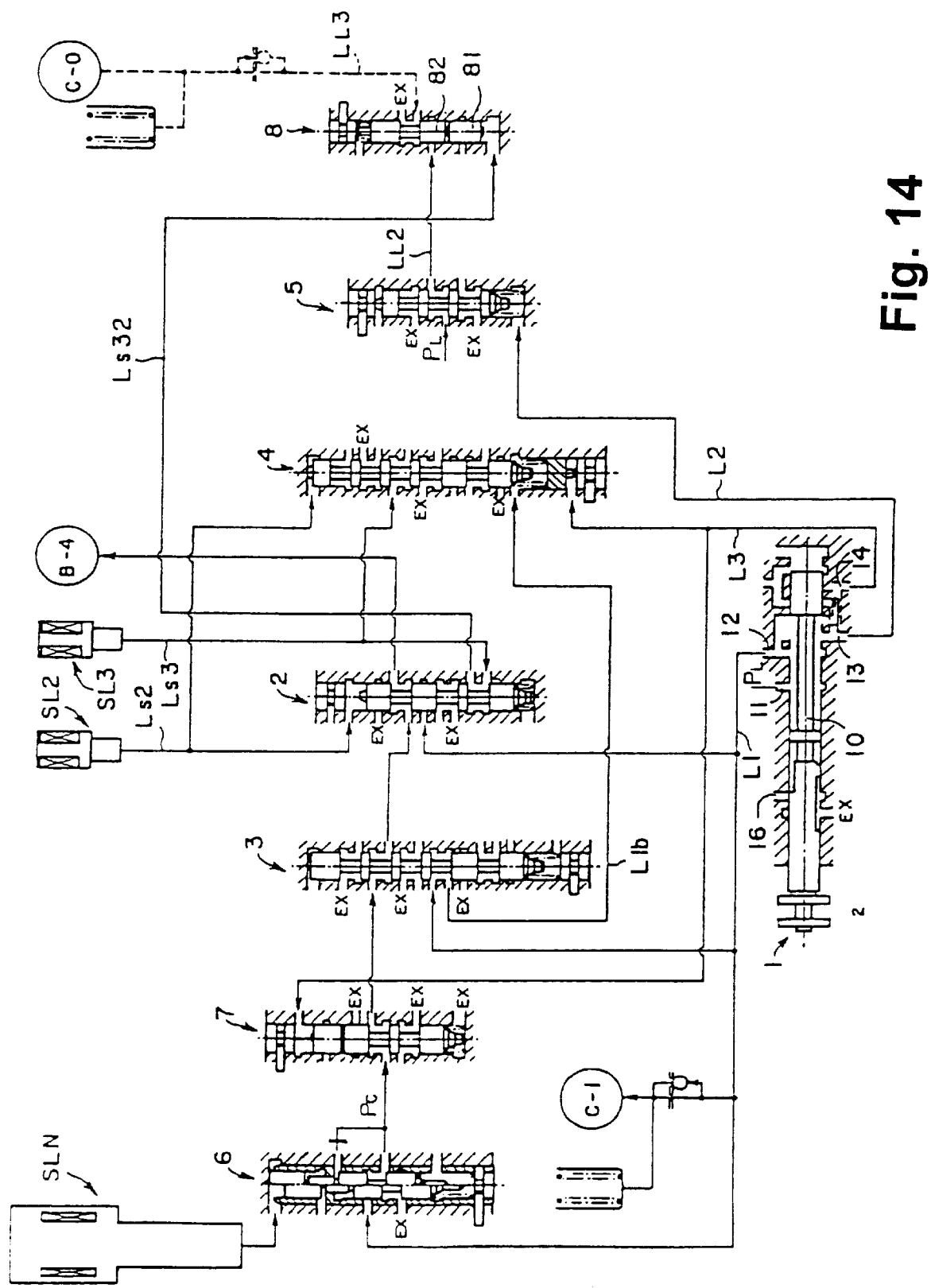
FIG. 14 is a schematic circuit diagram of the transmission circuit section of FIG. 11 showing a state of operation where the 1st gear is selected in a second range.

When the solenoid valve SL2 is turned off to move the 1–2 shifting valve to the position indicated in FIG. 14 from the above described position for selecting the second gear, the 2-range pressure being supplied to the second brake B-3 is cut off and drained by the 1–2 shifting valve. The control pressure PC being regulated by the pressure control valve 6 is then supplied to the brake B-4 by way of the relay valve 7 for the braking effect of the engine, the 2–3 shifting valve, and the 1–2 shifting valve. On the other hand, the signal pressure of the solenoid valve SL3 produced by turning off the second solenoid valve SL3 is supplied to the oil route LS32 via the oil route LS3 and the 1–2 shifting valve 2. This signal pressure is then applied to the plunger 81 of the second change-over valve which is the C-0 exhaust valve 8. As a result, the spool 82 of the C-0 exhaust valve 8 closes the oil route LL2 and drain the oil route LL3. Therefore, the hydraulic pressure for engaging the clutch C-0 is discharged through the route indicated by the broken line in FIG. 11 to disengage the clutch C-0 and therefore release the braking effect of the engine. Thus, the braking effect of the engine for the low gear in the 2-range is cancelled. Note that, in the above embodiment, the signal pressure of the solenoid valve SL3 is supplied to the C-0 exhaust valve 8 by way of the 1–2 shifting valve 2 so that the second solenoid valve SL3 may be used for control purposes where a gear other than the second gear is used (or for releasing the clutch C-0 when the top gear is selected in this particular embodiment).

With the above described transmission circuit, the use of the braking effect of the engine is avoided by releasing the clutch C-0 when the low gear is used in the 2-range. For this purpose, the signal pressure of the solenoid valve SL3 selected by the 1–2 shifting valve 2 is applied onto the C-0 exhaust valve 8. The C-0 exhaust valve 8 is arranged in the transmission circuit in order to avoid the braking effect of the engine during the gear shifting operation from the second gear to the third gear. The signal pressure of the solenoid valve SL3 is necessary as a signal for the gear shifting operation from the fourth gear to the top gear. In other words, no additional valve is required to avoid the braking effect of the engine.

Figure 15:
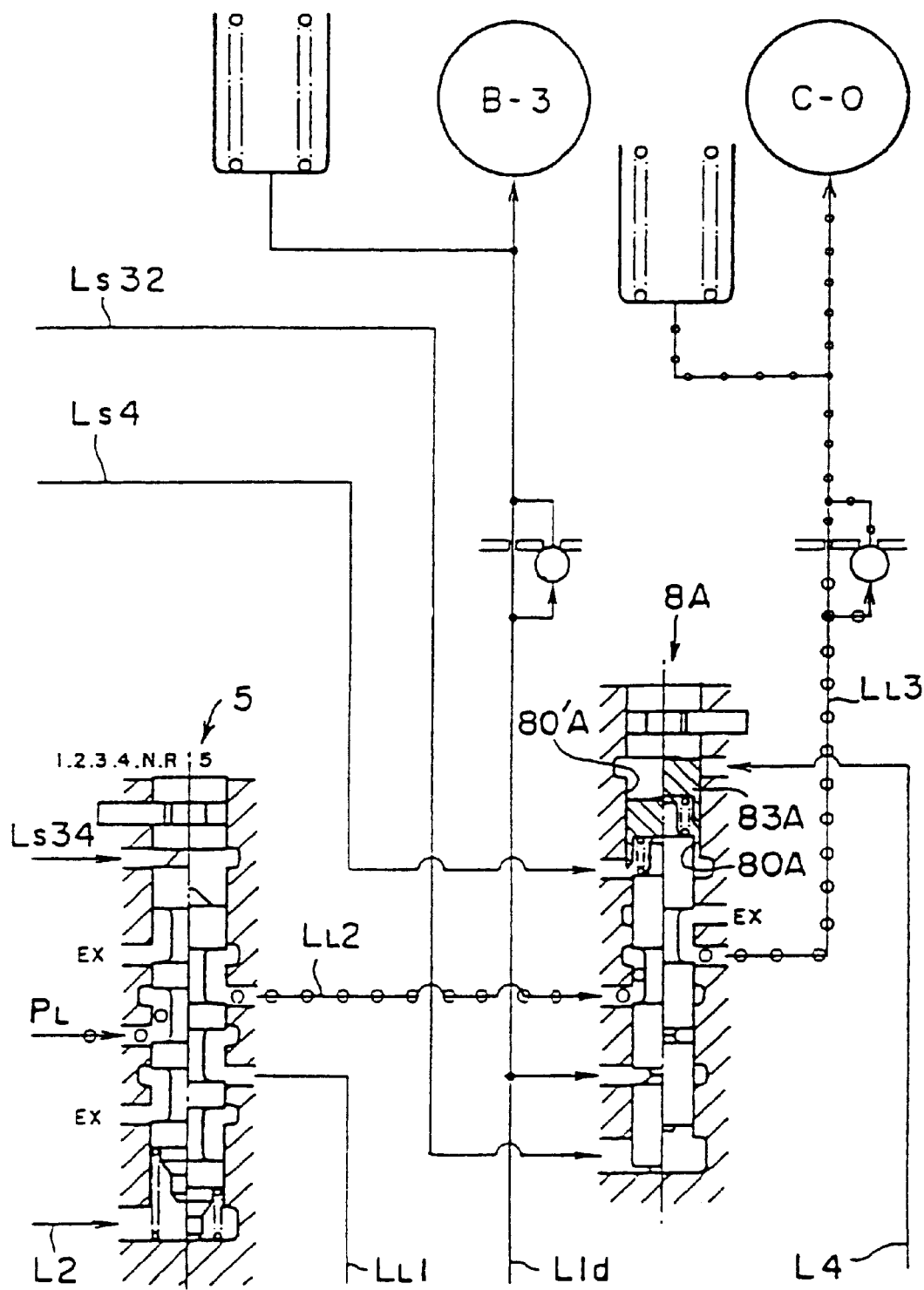
FIG. 15 is a schematic circuit diagram of the transmission circuit section of a hydraulic control unit similar to that of FIG. 11.

FIG. 15 is a schematic block diagram of a second example of an automatic transmission. This example differs from the above circuit in that the L-range pressure is applied onto the spring chamber 80A of the C-0 exhaust valve 8A of the second change-over valve by way of the manual valve 1. Thus, a plunger 83A is newly added to separate the signal pressure of the solenoid valve SL4 and the L-range pressure and the chamber 80'A behind the plunger is connected to the oil route L4. Otherwise, this circuit is nearly identical with the preceding circuit in terms of valve and circuit arrangement and therefore corresponding components are denoted by the same reference symbols and their description will not be repeated.

Thus, this circuit also operates satisfactorily as an automatic transmission. The L-range pressure is supplied to the C-0 exhaust valve 8A from the oil route L4. In case where no switching signal pressure is produced from the first solenoid valve SL4 due to a failure on the part of the electric signal system, the line pressure PL is supplied to the C-0 exhaust valve 8A from the oil route LL2 via the 4–5 shifting valve 5 and then further to the clutch C-0 through the route indicated by O marks in FIG. 15. Therefore, this circuit has an advantage that the braking effect of the engine is guaranteed as the low gear is maintained through the engagement of the clutch C-0 in the L-range.

While the automatic transmission that provides an object of control of an automatic drive controller according to the invention is described, the present invention is not limited thereto and a transmission other than the above described automatic transmission may also provide an object of control for the purpose of the invention.

(2) The configuration of an automatic drive controller

Figure 16:
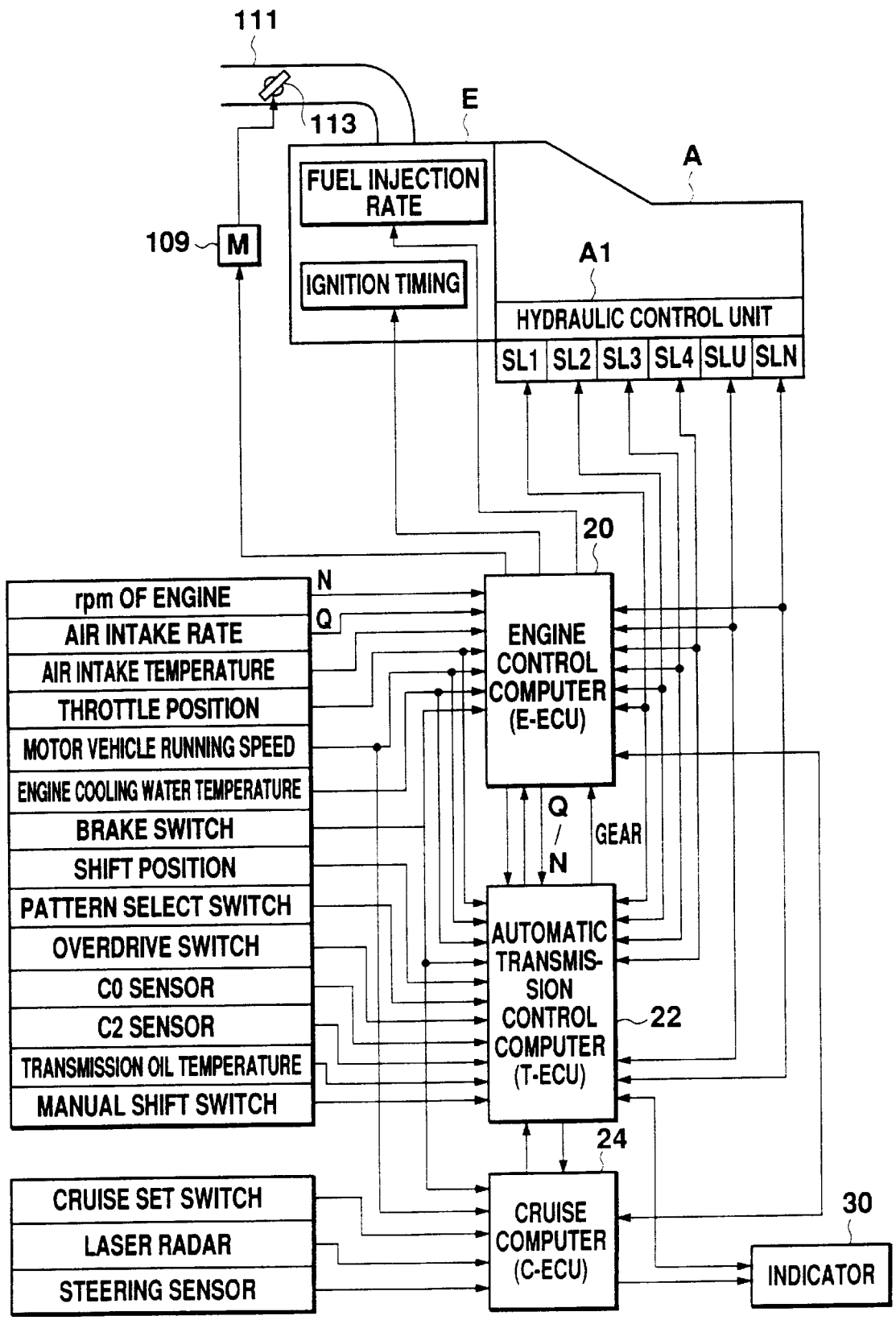
FIG. 16 is a schematic block diagram of an automatic drive controller according to the third embodiment of the invention.

FIG. 16 is a schematic block diagram of a motor vehicle drive system provided with an embodiment of automatic drive controller according to the invention. Referring to FIG. 16, an automatic transmission A is linked to the engine E of the motor vehicle. The automatic drive controller comprises an engine control computer (E-ECU) 20, an automatic transmission control computer (T-ECU) 22 and a cruise computer (C-ECU) 24, of which the E-ECU 20 and the T-ECU 22 operate as controllers for normal drive operations.

The E-ECU 20 receives, as input control data, data including those on the number of revolutions per minutes of the engine, the rate of air intake, the air intake temperature, the throttle position, the running speed of the motor vehicle, the temperature of the engine cooling water and signals from the brake switch. The E-ECU 20 regulates the power output of the engine E by controlling the throttle position of the engine E, the timing of ignition, and the rate of fuel injection on the basis of the input data. As for the throttle position, the E-ECU 103 determines a value for the throttle position on the basis of the input data and transmits a signal representing the value to drive the throttle actuator 109. Then, the electronic throttle 113 arranged in the air intake pipe conduit 111 is opened or closed until the throttle shows the extent of position corresponding to the control value determined by the E-ECU 20.

The T-ECU 22 receives, as input control data, data including those on the throttle position, the running speed of the motor vehicle, the temperature of the engine cooling water, signals from the brake switch, the gear shifting position, signals from the pattern select switch, signals from the overdrive switch, signals from the C0 and C2 sensors for respectively detecting the rates of revolution of the clutches C0 and C2, the oil temperature of the automatic transmission, and signals from the manual shifting switch and other signals. The T-ECU 22 then determines the gear to be selected for a gear shifting operation, the operation of turning on/off the lock-up clutch, the level of the line pressure and that of the engaging pressure on the basis of the input data and the map it stores. Thereafter, the T-ECU 22 transmits respective command signals to the predetermined solenoid valves according to what it has determined and controls the fail-safe system. As described above, the automatic transmission A is controlled for the gear shifting operations, the engine brake effect, the on/off operation of the lock-up clutch, the level of the line pressure, accumulator pressure, and the engaging pressure of the selected frictionally engaging members by means of the hydraulic control unit A1. Thus, the solenoid valves of the hydraulic control unit A1 are arranged for controlling the gear shifting operation, the engine brake effect, the on/off operation of the lock-up clutch, the level of the line pressure, accumulator pressure and the engaging pressure of the selected frictionally engaging members.

Figure 17:
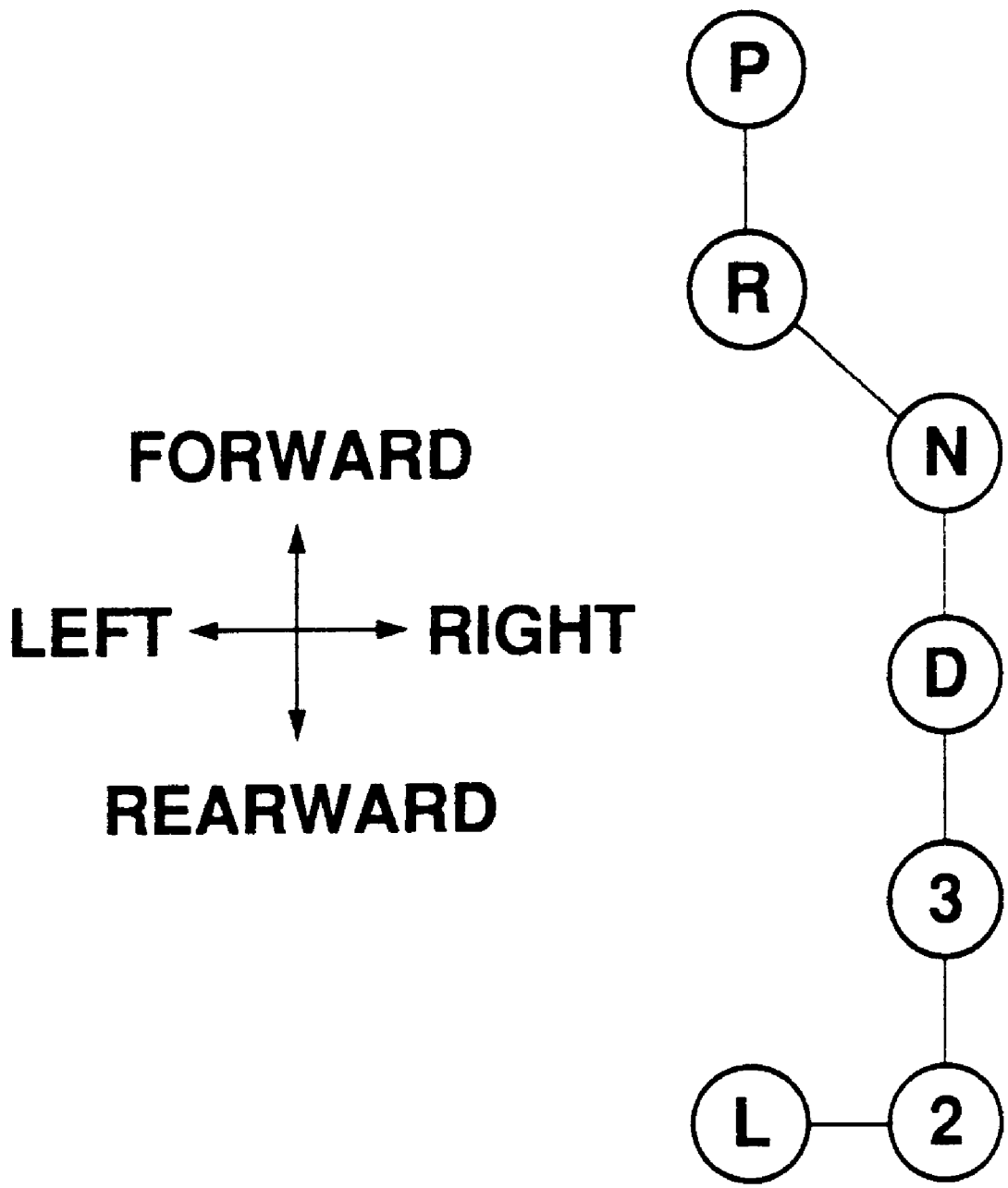
FIG. 17 is a schematic illustration of possible positional shifts of the shift lever to be connected to the automatic transmission of FIG. 11.

The automatic transmission A of FIG. 16 is adapted to five forward drive gears and a rearward drive gear. FIG. 17 schematically illustrates the positions that the shift lever can take in order to be linked to the automatic transmission of 11. As shown, there are provided ranges for parking (P), rearward driving (R), and neutral gearing (N) along with D-, 3-, 2-, and L-ranges. The D-range allows a top-gear drive when an overdrive mode is selected.

The E-ECU 20 and the T-ECU 22 are connected with each other for data communication. The E-ECU 20 transmits, along with other data, signals for the volume of air intake per revolution and other data to the T-ECU 22, whereas T-ECU 22 transmits, along with other data, signals for the operation of the solenoids and the gear shifting operation. For example, the E-ECU 20 may reduce the rate of fuel injection during a gear shifting operation being conducted by the automatic transmission A, change the ignition timing and/or reduce the opening of the electronic throttle valve 113 to temporarily reduce the output torque.

Figure 18:
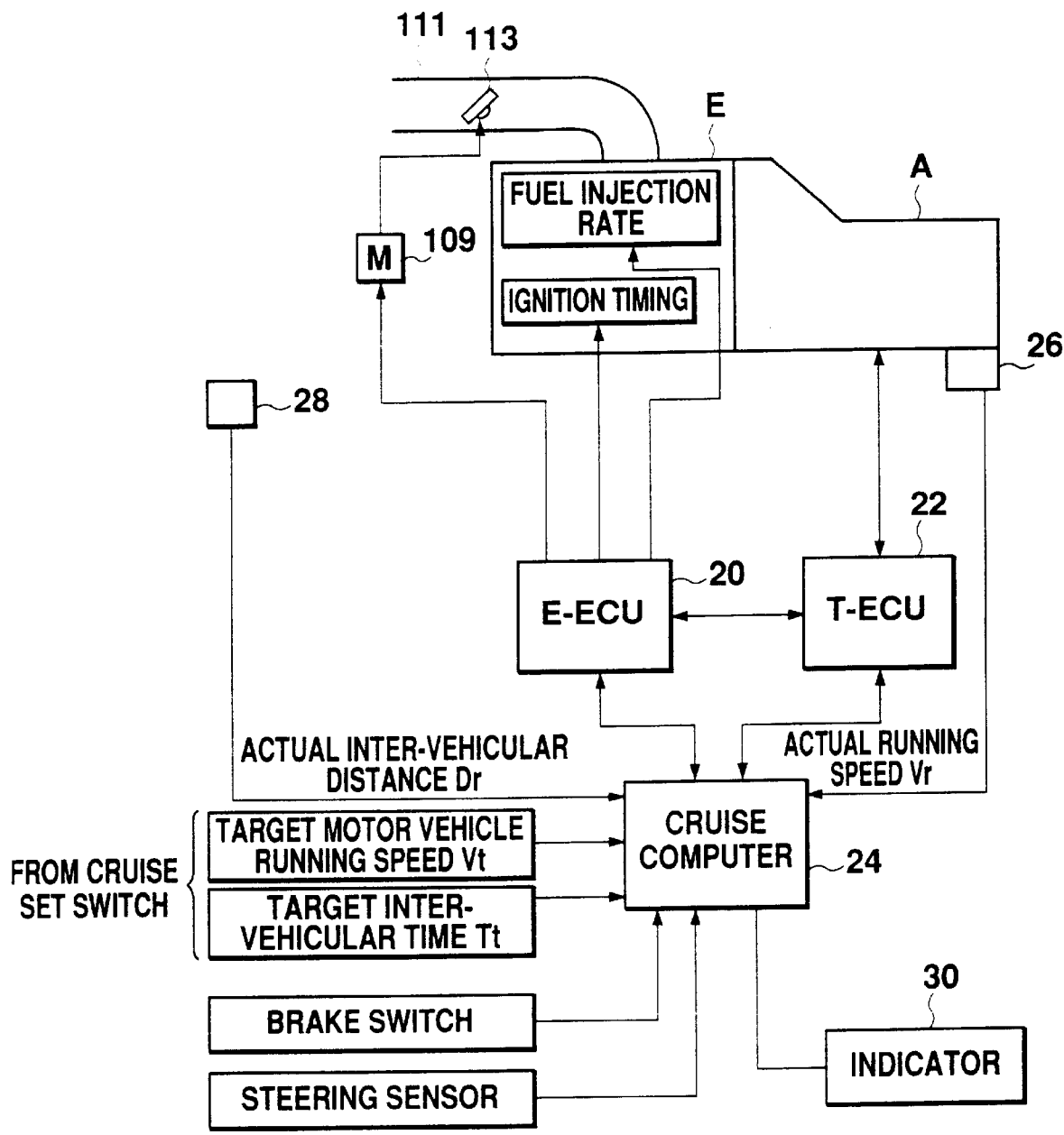
FIG. 18 is a block diagram of the cruise computer and some of the related elements of the automatic drive controller according to the third embodiment of the invention.

The operation of the C-ECU 24 will next be described by referring to FIG. 18. The C-ECU 24 receives a signal for the target running speed Vt or for the target inter-vehicular time from the cruise set switch. These signals may change depending on the manual operation of the switch by the driver. The target running speed Vt is used when the motor vehicle is operating at a constant running speed, while the target inter-vehicular time Tt is the time period required for the motor vehicle to run the inter-vehicular distance with the measured running speed when it is following a target vehicle. Tt may typically be two seconds although Tt may be replaced by the target inter-vehicular distance. The C-ECU 24 additionally receives a signal for the detected running speed of the vehicle (hereinafter referred to as actual running speed Vr) from the running speed sensor 26 fitted to the automatic transmission A. The C-ECU 24 further receives a signal representing the inter-vehicular distance between a target vehicle and the follower vehicle (hereinafter referred to as actual inter-vehicular distance Dr) detected by the laser radar 28 fitted to a front area of the motor vehicle along with signals coming from the brake switch and the steering sensor.

Figure 19:
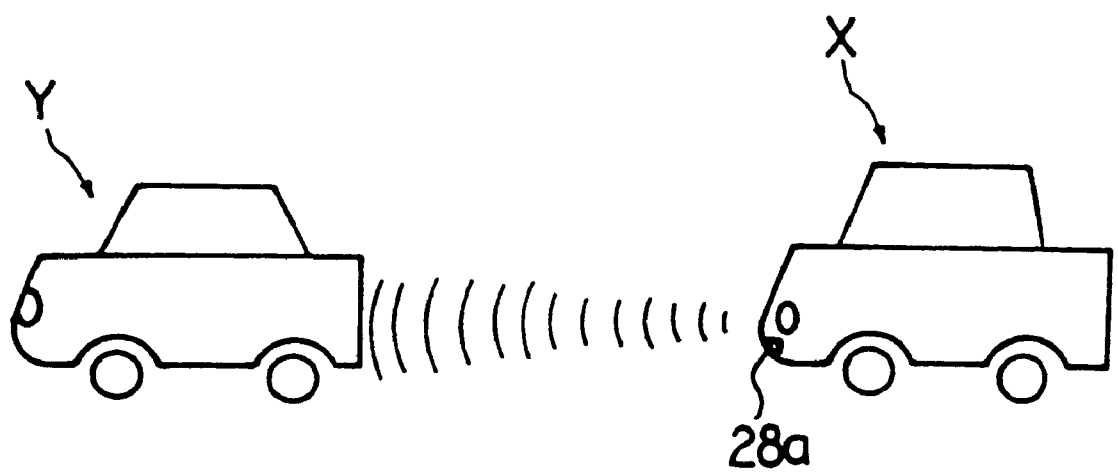
FIG. 19 is a schematic illustration showing the position where the receiver of a laser radar is located on a motor vehicle.

The transmitter/receiver 28a of the laser radar 28 is arranged at a front area of the motor vehicle as shown in FIG. 19 to transmit and receive a laser beam. More specifically, the laser beam transmitted from the transmitter/receiver 28a of the motor vehicle is reflected by a leading vehicle Y and then received by the transmitter/receiver 28a. The laser radar 28 then calculates the inter-vehicular distance from the time lag between the time when the laser beam is emitted and the time it is received.

The C-ECU 24 then determines if the motor vehicle has to be accelerated or decelerated according to the various input data it receives and transmits a control signal representing what is determined to the E-ECU 20 and the T-ECU 22. The engine E and the automatic transmission A are controlled by the control signal so that the running speed of the vehicle may be accelerated or decelerated to achieve the target running speed Vt or the target inter-vehicular time Tt.

The C-ECU 24 additionally displays necessary pieces of information on the indicator 30 arranged in front of the driver. Those pieces of information may include that the motor vehicle is running under the control of the automatic drive controller or that the automatic drive control is suspended.

(3) Automatic drive control

The automatic drive control function of the automatic drive controller will next be described. When no leading vehicle is detected by the laser radar 28 within a predetermined distance in front of the motor vehicle, the motor vehicle is made to run at a constant running speed. Under this condition, the motor vehicle is accelerated if the actual running speed Vr is lower than the target running speed Vt, whereas it is decelerated if the actual running speed Vr is higher than the target running speed Vt so that the motor vehicle may achieve the target running speed Vt.

If a leading vehicle is detected by the laser radar 28 within the predetermined distance in front of the motor vehicle, the automatic drive controller selects this vehicle as the target vehicle and begins following it. The controller calculates the required inter-vehicular distance (hereinafter referred to as required inter-vehicular distance Dx) from the product of the target inter-vehicular time Tt and the actual running speed Vr and then so regulates the running speed of the motor vehicle as to make the actual inter-vehicular distance Dr equal to the required inter-vehicular distance Dx. Thus, the motor vehicle follows the target vehicle with the calculated inter-vehicular time Tt.

The running speed of the target vehicle (which can be calculated from the inter-vehicular distance Dr and the actual running speed Vr of the following motor vehicle) may exceed the target constant running speed Vt. Under this condition, the automatic drive controller so controls the motor vehicle as to run at the constant running speed Vt. The inter-vehicular distance between the target vehicle and the following vehicle therefore increases and the target vehicle may eventually be lost.

Next, the operation of the automatic drive controller for controlling the braking effect of the engine, the shift change pattern, the lock-up function, and the process of changing the throttle position pattern will be described by referring to the flow chart of FIG. 20. The operation is conducted on the basis of the target running speed Vt, the target inter-vehicular time Tt, the actual running speed Vr, and the actual inter-vehicular distance Dr in order to properly control the engine E and the automatic transmission A. FIGS. 21A through 21D illustrate references for the operation of the automatic drive controller.

Figure 20:
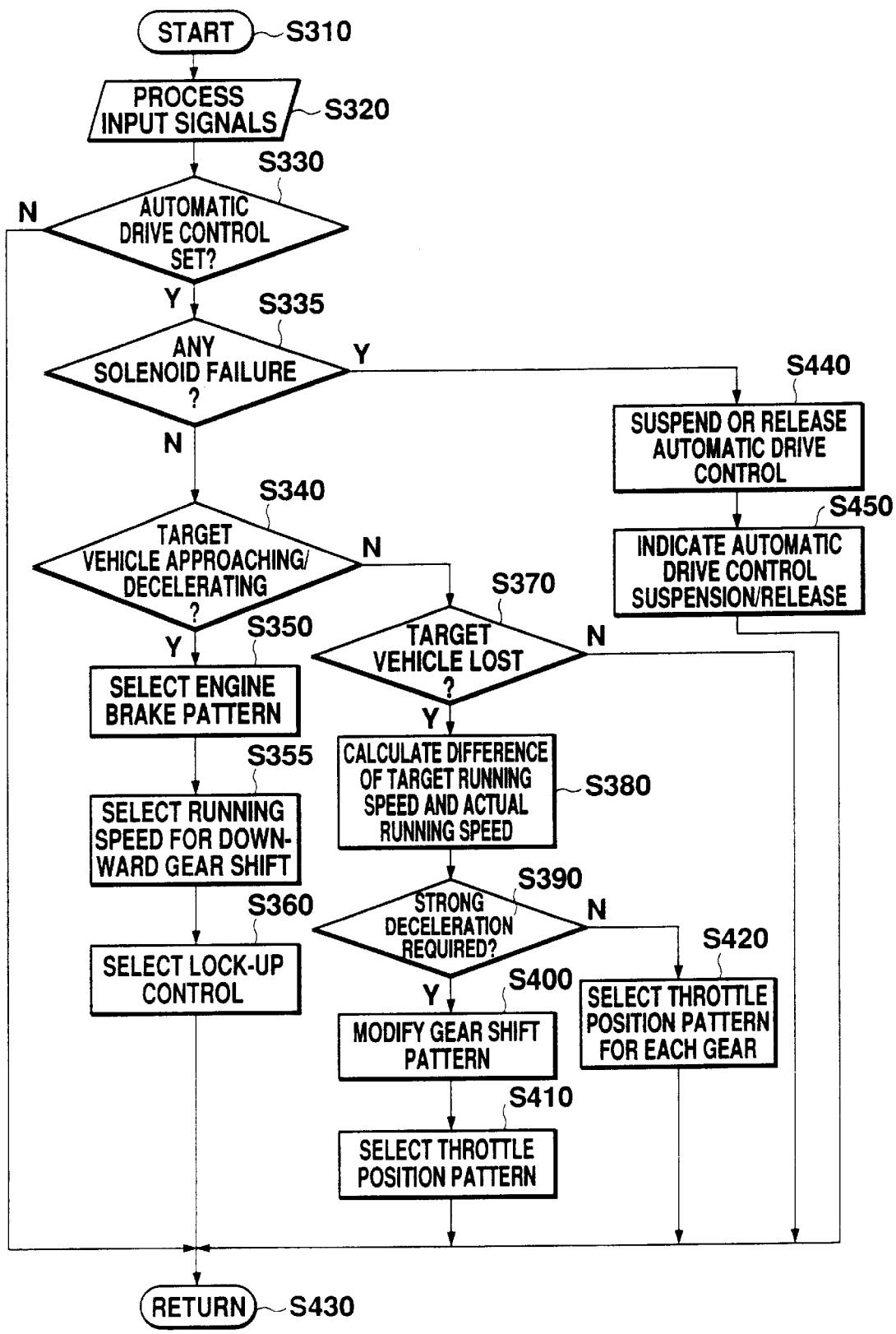
FIG. 20 is a flow chart of the control operation of the third embodiment of automatic drive controller of FIG. 18.

Referring to FIG. 20, as the operation begins (S310), the automatic drive controller receives signals (S320) and determines whether or not automatic drive control must be set according to the on/off state of the automatic drive control set switch (S330). If the answer is NO, the process proceeds to "return" (S430), whereas, if the answer is YES, it proceeds to Step S335, where it determines whether or not the solenoids SL1 through SL4 and the linear solenoids SLU and SLN of the automatic transmission A have failed. If the solenoids have not failed, the process continues to Step S340, where it determines if the target vehicle is approaching it and being decelerated or not on the basis of the rear inter-vehicular distance Dr detected by the laser radar 28. The answer at Step S340 will be YES when the target vehicle is decelerating or a new vehicle intervenes. When the answer at Step S340 is YES, the automatic drive controller appropriately modifies control of the engine E and the automatic transmission A at Steps S350 and S360 before it proceeds to "return" (S430).

Step S350 Mode change for the use of engine braking effect

Figure 21B:
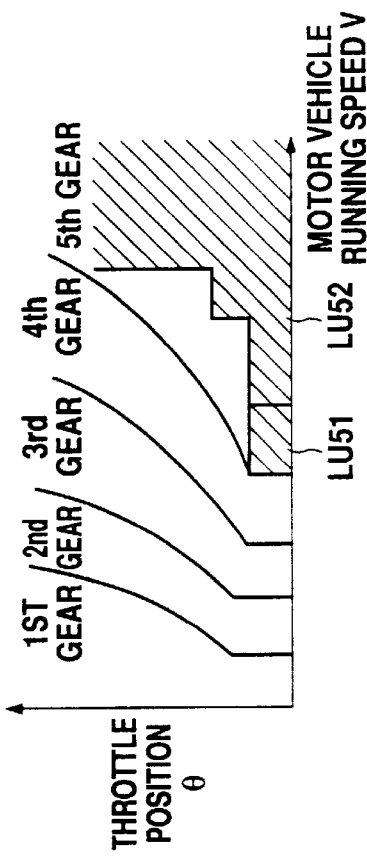
FIGS. 21A through 21D illustrate the selection of reference values in an automatic drive controller with FIG. 21A being a graph showing the relationship between the throttle opening and the elapsed time, FIG. 21B being a graph showing a gear shift diagram and lock-up control regions, FIG. 21C being a schematic illustration of a lock-up mechanism, and FIG. 21D being a chart showing utilization of the engine braking effect.
Figure 21D:
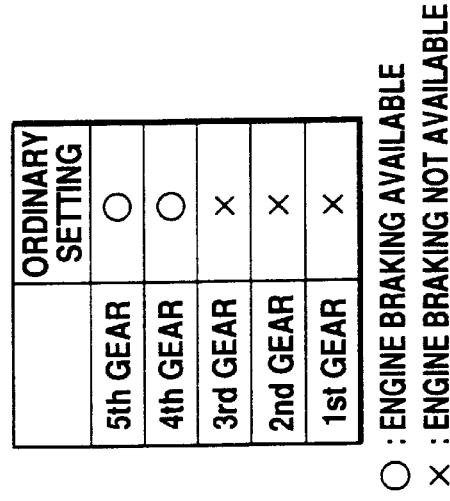

FIG. 21D illustrates the reference pattern of engine brake operation, and the pattern also sows how the braking effect of the engine is utilized by the automatic drive controller to maintain a constant running speed. The figure shows if the braking effect of the engine can be utilized for each gear or not. As shown, the braking effect is available for the 4th and top (5th) gears and not available for the low (1st), 2nd or 3rd gears. The T-ECU 22 controls the automatic transmission A on the basis of this table. Note that the arrangement of FIG. 22D is identical with the arrangement of the D-range when the drive system is not under the automatic drive control.

Figures 22, 23:
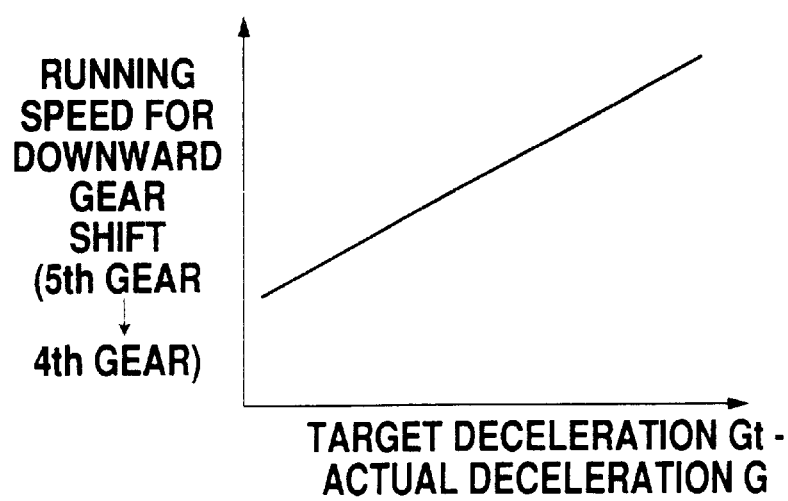
FIG. 22 is a chart showing how the braking effect of the engine is utilized for deceleration in the automatic drive controller of FIG. 18.
FIG. 23 is a graph showing how a downward gear shifting operation is conducted for deceleration in the automatic drive controller of FIG. 18.
Figure 24:
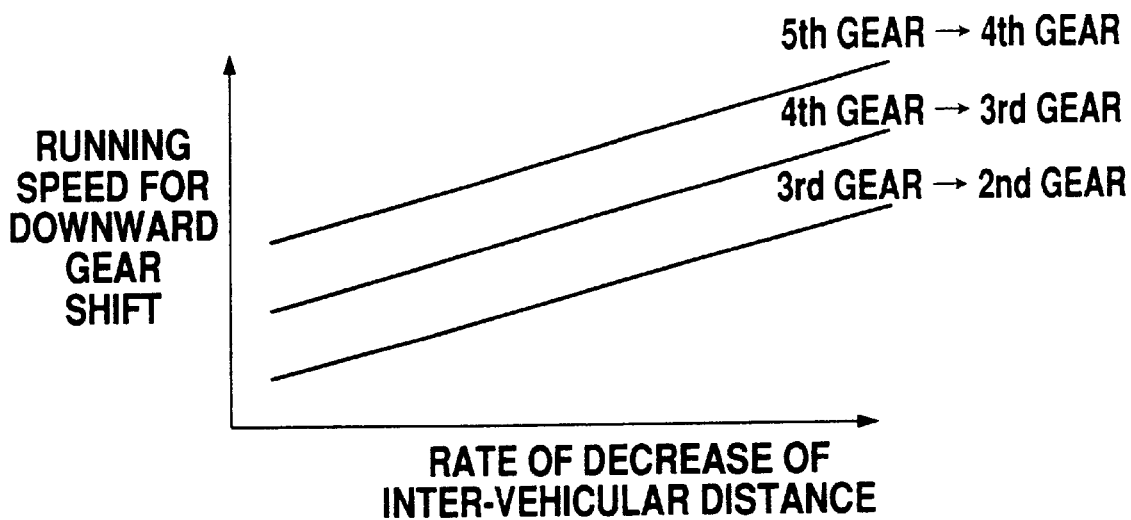
FIG. 24 is a graph showing how downward gear shifting operations are conducted for deceleration by the automatic drive controller of FIG. 18.
Figure 25:
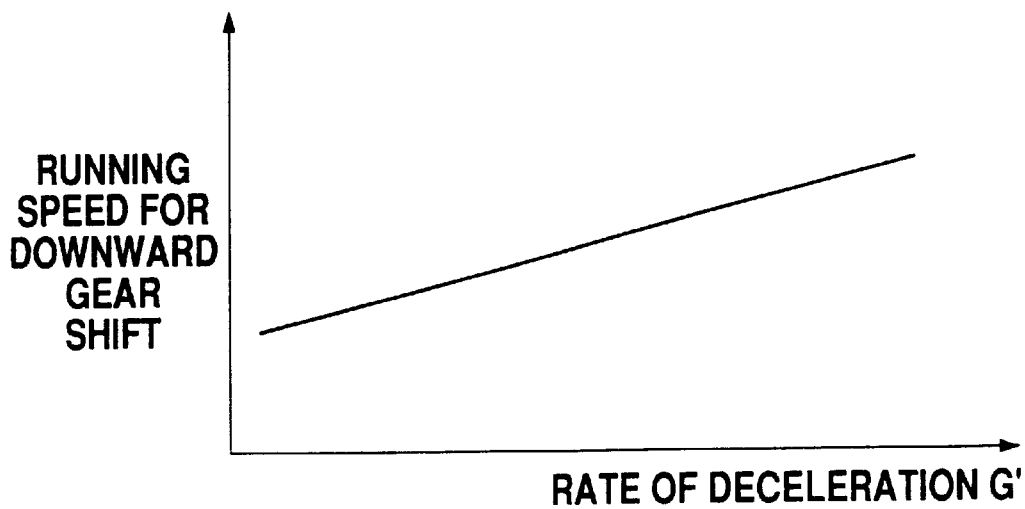
FIG. 25 is another graph showing how a downward gear shifting operation is conducted by the automatic drive controller of FIG. 18 for deceleration.

FIG. 22 illustrates an example of how the engine brake operation pattern (the braking effect of the engine) can be modified in Step S350. After being modified, the braking effect of the engine is available for the 2nd through top gears and therefore the T-ECU 22 now operates on the basis of the table. For instance, the automatic transmission is so controlled as to utilize the braking effect of the engine for the 3rd gear when a downward gear shifting operation is conducted to come down from the 4th gear to the 3rd gear.

Note that, the low gear is not used for automatic drive control with this embodiment and, therefore, no change is made for the low gear to utilize the braking effect. If the sports mode, a mode of operation where the driver can shift gears and the braking effect of the engine is available for each of the gears (see inter alia Japanese Patent Laid-Open Publication No. Hei 5-332443), is selected before the activation of the automatic drive controller, a mode for utilizing the braking effect of the engine will automatically be used.

Step S355 Mode change for a downward gear shifting operation using a gear shift regulation pattern FIG. 21B is a graph showing reference setting of a gear shift diagram and lock-up control regions. The axis of abscissa and the axis of ordinate respectively represent the running speed and the throttle position. The speed for gear shifts is defined for each of the gears in FIG. 21B. When the actual running speed reaches the predetermined running speed on the gear shift pattern, the T-ECU 22 controls the automatic transmission A so as to cause it to carry out an appropriate gear shifting operation. Note that, while FIG. 21B shows a gear shift pattern for downward gear shifting operations, a similar pattern is also provided for upward gear shifting operations.

FIG. 23 is a graph showing how a downward gear shifting operation is conducted by the automatic drive controller in Step S355. In this step, the required inter-vehicular distance Dx is calculated from the target running speed Tt and the actual running speed Vr, and the target deceleration Gt is determined on the basis of the required inter-vehicular distance Dx and the actual inter-vehicular distance Dr. The target deceleration Gt is predetermined on a map (not shown). Note that, in view of the necessary extent of deceleration, the greater the difference between the required inter-vehicular distance Dx and the actual inter-vehicular distance Dr, the greater the target deceleration Gt. On the other hand, the actual deceleration G is calculated on the basis of the actual running speed Vr. Then, the gear shift pattern is modified in such a way that the greater the difference between the target deceleration Gt and the actual deceleration G, the higher the speed for a downward gear shifting. This modifying operation is optimized for each of the gears. Thus, when a large deceleration is required, the braking effect of the engine for a lower gear is utilized early to reduce the time required to achieve the inter-vehicular time Tt.

Example 1 for modifying the operation of Step S355

The reduction per unit time of the inter-vehicular distance (hereinafter referred to as inter-vehicular distance reduction rate) is calculated from the change with time of the actual inter-vehicular distance Dr. Then, the gear shift pattern is modified in such a way that the greater the inter-vehicular distance reduction rate, the higher the speed for the downward gear shifting. This modifying operation is also optimized for each of the gears. Thus, the automatic drive controller determines that deceleration is strongly required when the target vehicle is approaching rapidly.

Example 2 for modifying the operation of Step S355

A target value G' is determined for the change per unit time of deceleration on the basis of the detected values of the actual running speed Vr and the actual inter-vehicular distance Dr. The target value G' of the change per unit time of deceleration is predetermined on a map not shown. Note that, in view of the necessary extent of deceleration, the greater the actual running speed Vr and the smaller the actual inter-vehicular distance Dr, the greater the target value G' for the change per unit time of deceleration. Then, the gear shift pattern is modified in such a way that the greater the target value G' for the change per unit time of deceleration, the higher the speed for downward gear shifting. This modifying operation is also optimized for each of the gears. Thus, the automatic drive controller determines that deceleration is strongly required when the target value G' for the change per unit time of deceleration is large.

Step S360 Changing the lock-up slip ratio by lock-up regulating means

FIG. 21B shows reference lock-up control regions along with a gear shift pattern. The lock-up control is an operation for brining the lock-up clutch arranged in parallel with the torque converter into engagement as shown in FIG. 21C. With this control operation, the output torque transmission ratio from the engine to the automatic transmission becomes higher than its counterpart conducted by way of the torque converter and fuel consumption is thereby economized.

The lock-up control is conducted over the entire range between 0 and 100% of the lock-up clutch slip ratio (hereinafter referred to simply as slip ratio). The clutch is in a locked-up state when the slip ratio is 0% and in an unlocked-up state (where no lock-up control is used) when the slip ration is 100%. A lock-up slip state takes place between the two extremes. As indicated by shaded areas in FIG. 21B, lock-up control regions are normally provided for part of the operation of the top gear. Region LU51 is for the slip ratio of 0% and region LU52 on the lower region side is for the slip ratio of 0–100%. No lock-up control is conducted for the low through 4th gears. In other words, the lock-up slip ratio is constantly at 100%. Thus, a high output torque transmission ratio is realized by lock-up control normally for the top gear to economize the fuel consumption.

Figure 26:
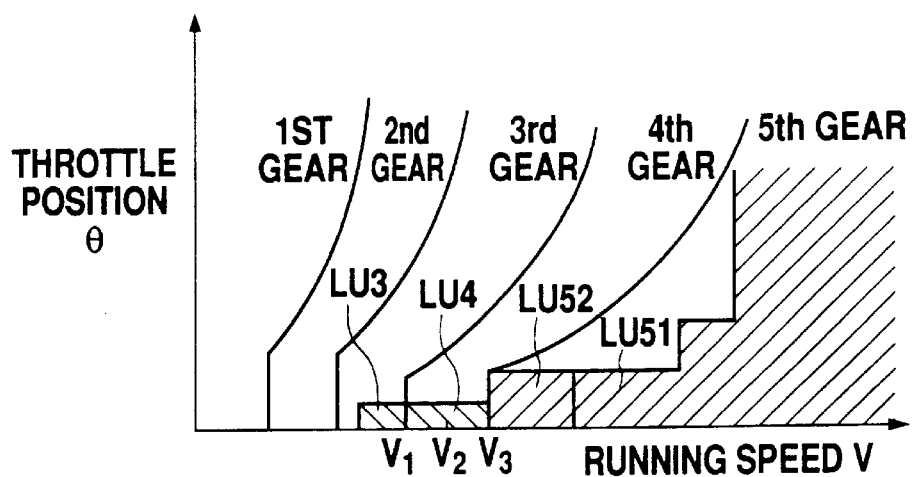
FIG. 26 is a graph showing how reference values are modified for the lock-up mechanism for deceleration in the automatic drive controller of FIG. 18.

FIG. 26 is a graph obtained by modifying that of FIG. 21B at Step S360. Here, lock-up control is utilized to increase the rate of deceleration of the motor vehicle by means of the braking effect of the engine. More specifically, the engine is driven by way of the rotary power of the axle when the braking effect of the engine is used. Then, the motor vehicle is decelerated as the rotary resistance of the engine is transmitted to the automatic transmission. Conventionally, the rotary resistance is transmitted exclusively by way of the torque converter T. In this embodiment, on the other hand, the rotary resistance is transmitted by way of the lock-up clutch to consequently improve the transmittivity of rotary resistance and, therefore, the braking effect of the engine and the rate of deceleration.

The lock-up control regions of FIG. 26 are obtained by modifying FIG. 21B. In FIG. 26, the lock-up control regions (regions LU51 and LU52) for the top gear are the same as those of FIG. 21B for normal operation. Lock-up control regions LU4 and LU3 are additionally provided for the entire operation of the 4th gear and part of the operation of the 3rd gear, respectively. Both of the regions LU4 and LU3 are for the slip ratio of 0–100%. When the selected gear, the running speed and the throttle position correspond to either of these regions, the lock-up clutch is controlled for a slip state.

Figure 27:
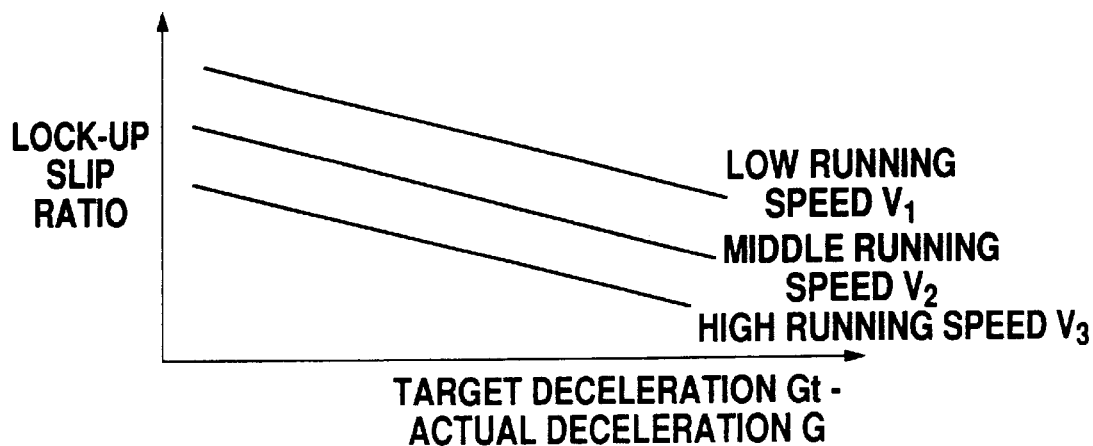
FIG. 27 is a graph showing how the lock-up slip ratio is regulated for deceleration in the automatic drive controller of FIG. 18.

At Step S360, an operation for regulating the lock-up slip ratio typically as shown in FIG. 27 is carried out. FIG. 27 shows an operation for the 4th gear. In this operation, the difference between the target deceleration Gt and the actual deceleration G is determined and, when the difference is large, the lock-up slip ratio is modified downwardly by a large amount. The lock-up slip ration is also modified downwardly when a high running speed is detected. (The running speeds v1 through v3 in FIG. 27 correspond respectively to the running speeds v1 through v3 of FIG. 26.) While the operation is described above for the 4th gear, a similar operation is also carried out for each related gear. With this modifying operation, the rate of deceleration is increased by utilizing the braking effect of the engine when deceleration is strongly required. Consequently, the deceleration time necessary to achieve the target inter-vehicular time Tt is reduced.

Example for modifying Step S360

Figure 28:
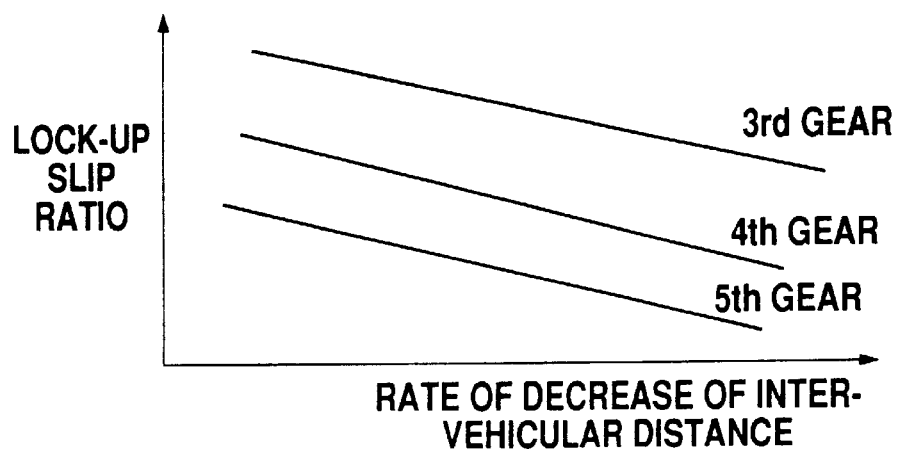
FIG. 28 is another graph showing how the lock-up slip ratio is regulated for deceleration in the automatic drive controller of FIG. 18.

FIG. 28 shows that the lock-up slip ratio is reduced when the rate of decrease of the inter-vehicular distance is large. Here again, the lock-up slip ratio is regulated as a function of the running speed of the vehicle as shown in FIG. 27 for each of the gears as shown in FIG. 28.

The automatic drive controller determines that deceleration is strongly required when the target vehicle is approaching rapidly. The automatic drive controller operates in a manner as described above when the answer at Step S340 is YES (when the target vehicle is approaching). If the answer at Step S340 is NO, it determines if the target vehicle is lost or not (Step S370) and, if not, proceeds to "return" (Step S430). The answer at Step S370 is typically YES when the target vehicle accelerates and the inter-vehicular distance is increased beyond a predetermined value or when the target vehicle has changed lanes. If the target vehicle is lost, the automatic drive controller terminates the follower mode and causes the motor vehicle move at a constant running speed.

When the follower mode is terminated, the actual running speed Vr is lower than the target running speed Vt. The gears are down shifted during the follower mode when the actual running speed Vr decreases and when deceleration is required so that the motor vehicle is moving by using a lower gear. With the flow chart of FIG. 20, when the target vehicle is lost, the automatic drive controller carries out the operations at Steps S380 through S420 and modifies the pattern of controlling the engine E and the automatic transmission A as will be described below.

If the answer to the question at Step S370 is YES, then the automatic drive controller calculate the difference between the target running speed Vt and the actual running speed Vr (S380) and compares the calculated difference in the running speed with a predetermined value to determine whether or not the motor vehicle must be accelerated strongly (S390). If the difference is greater than the predetermined value, the controller determines that acceleration is greatly required by the motor vehicle (YES) and proceeds to the modifying steps of S400 and S410 before continuing to "return" (S430).

Figure 29:
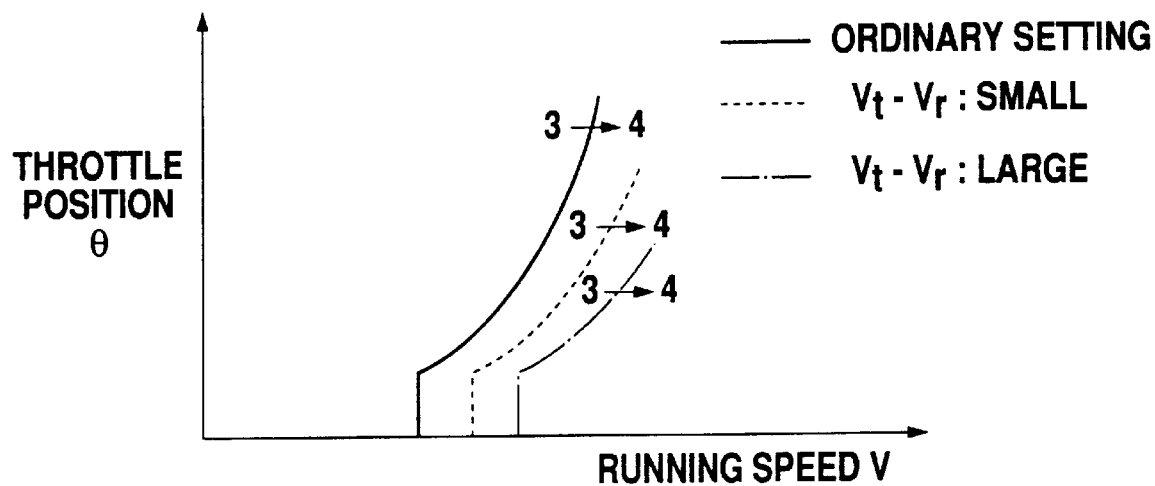
FIG. 29 is a graph showing how reference values are modified for the transmission pattern for acceleration in the automatic drive controller of FIG. 18.

Step S400 Modification to the gear shift pattern by gear shift pattern regulating means FIG. 29 shows an operation of modifying the gear shift pattern at Step S400 when a shift from the 3rd gear to the 4th gear takes place. Referring to FIG. 29, the solid line shows the normal gear shift pattern. In Step S400, the gear shift pattern is modified to show a pattern indicated by the broken line or one indicated by the dotted broken line to increase the speed for gear shift. Note that the running speed is greatly changed when the target running speed Vt and the actual running speed Vr show a large difference.

With the modified gear shift pattern, the motor vehicle is made to move with a lower gear until it achieves a relatively high speed. In other words, the motor vehicle can be accelerated easily with the modified pattern to realize the target running speed Vt in a short time. Pattern modification is predetermined based on the difference between the target running speed Vt and the actual running speed Vr. When the difference is large, strong acceleration is required.

While a shift from the 3rd gear to the 4th gear is described above for Step S400 by referring to FIG. 29, the gear shift pattern is obviously modified for other gears as well at this step. The pattern for downward gear shifting operation is also modified to adapt the automatic transmission to a higher running speed. The motor vehicle can be made to move at a constant mode and the pattern of downward gear shifting operation is modified to the higher speed side while it is running in the 5th gear. A downward gear shifting operation may take place in such a situation.

Alternatively, the gear shift pattern may be so modified that the selected gear is held effective throughout the acceleration phase.

Figure 21A:
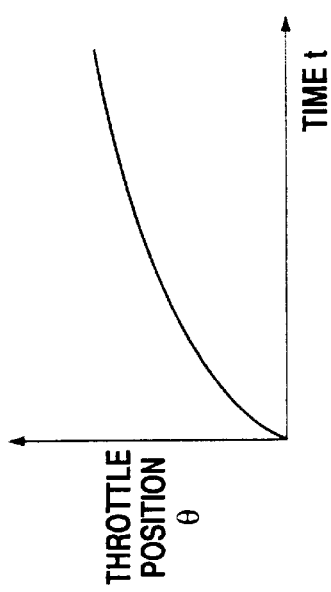
Figure 21C:
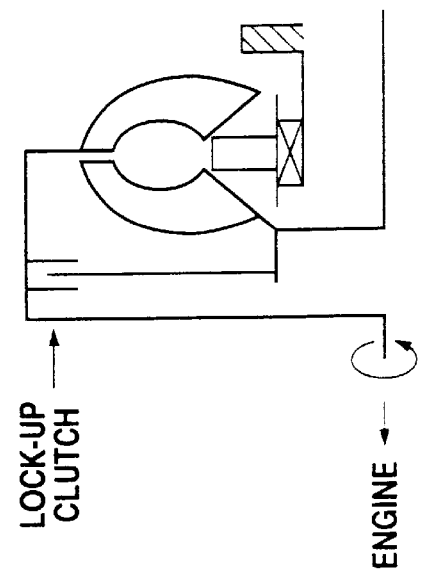

Step S410 Modification to the throttle position pattern by throttle position regulating means FIG. 21A shows a graph for normal throttle position operations under the control of the E-ECU 20. The axis of abscissa and that of ordinate respectively represent time and the throttle position. Thus, the graph shows the rate at which the throttle is opened. In reality, the throttle may be operated to enlarge the opening in a few seconds. The E-ECU 20 controls the throttle opening/closing actuator to change the throttle position according to the graph. As the throttle opening is increased, the power output of the engine rises.

Figure 30:
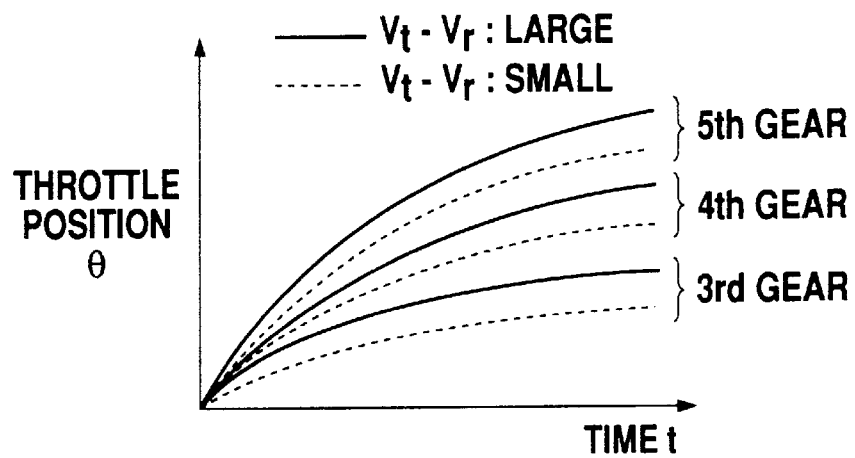
FIG. 30 is a graph showing how reference values are modified for acceleration in the automatic drive controller of FIG. 18.

FIG. 30 is a graph showing how the throttle position pattern is modified for the current gear at Step S410. The currently operating gear is found at Step S400. The rate of enlarging the throttle opening is large when a higher gear is currently operating. With this modification, the engine output torque rises more quickly in the initial stages of the acceleration phase when a higher gear is in operation. On the other hand, the gear shift ratio of the automatic transmission A is smaller for a higher gear. Thus, with this modification, level drive torque of the wheels can be obtained regardless of the currently operating gear. In other words, feeling of slow acceleration with a higher gear will be eliminated. Thus, the throttle position pattern is so regulated as to optimize the feeling of acceleration with FIG. 30.

Then, at Step S410, the throttle opening operation is so regulated that the throttle is opened quickly and widely when the difference between the target running speed Vt and the actual running speed Vr is large as seen from FIG. 30. The automatic drive controller determines that acceleration is strongly required when the difference is large.

Thus, the automatic drive controller operates in a manner as described above when the answer to the question at Step S390 is YES (and acceleration is strongly required). If, on the other hand, the answer to the question at Step S390 is NO (and hence no strong acceleration is required), the controller controls the throttle opening for the currently operating gear in the way as described above for Step S410. The gear shift pattern is not modified here because no strong acceleration is necessary. Only the throttle position pattern is modified to improve the feeling during the acceleration phase.

As described above, when the target vehicle is approaching and being decelerated, the mode of utilizing the braking effect of the engine, the gear shift pattern, and the lock-up slip ratio are modified at Steps S350, S355 and S360 in order to strongly decelerate the running motor vehicle and quickly achieve the required running speed. It should be noted that the above factors are modified largely to decelerate the motor vehicle optimally when deceleration is strongly required.

When the target vehicle is lost and the automatic drive controller terminates the follower mode and makes the motor vehicle move at a constant running speed, the gear shift pattern and the throttle opening operation are modified to adapt the automatic transmission to acceleration as described above for Steps S400 through S420. Consequently, the time period of the acceleration phase for achieving the target running speed will be reduced, while improving the feeling of acceleration. Note that, the above modifications are remarkable when acceleration is strongly required.

(4) Characteristic control operations the invention

The control operations at Steps S335, S440 and S450 shown in FIG. 20 are characteristic to the specific present invention. As described above, at Step S335, the automatic drive controller determines if the solenoids SL1 through SL4 and the linear solenoids SLU and SLN of the automatic transmission A have failed according to signals from each solenoid. If they have not failed and are operating well, the automatic drive controller proceeds to Step S340.

If any of the solenoids has failed, the automatic drive controller goes to Step S340 and suspends operations. Therefore, the automatic drive control system does not operate if the cruise set switch is pressed. No automatic drive control operation occurs and no command is issued from the C-ECU 24 to the E-ECU 20 and the T-ECU 24. If the automatic drive control is already on, it becomes inoperative.

Automatic drive control may be kept on without producing any serious problem if strong deceleration is not required. However, automatic drive control is turned off under such condition in order to simplify the entire control operation as will be described hereinafter.

Then at Step S450, suspension (or release) of automatic drive control is indicated as the C-ECU 24 causes the indicator lamp 30 to flash. Note that the indicator lamp 30 may be replaced by an indicator buzzer that notifies the driver of the situation with sound, or by a speaker verbalizing the above information. After completing the operation at Step S450, the automatic drive controller proceeds to "return" (S430).

The above feature is characteristic of the third embodiment of the invention. When any of the solenoids of the automatic transmission A fails, the automatic transmission A is automatically made to carry out an upward gear shifting operation by the hydraulic control unit A1. When the linear solenoid SLU fails, the lock-up control operation is not conducted properly. When, on the other hand, the linear solenoid SLN fails, the timing of gear shifting operation may go out of synch. Thus, the extent of deceleration may not be raised any more by controlling the downward gear shifting operation, the braking effect of the engine and/or the lock-up slip when any of the solenoids fails. Then, impact may be felt by the driver at the time of gear shifting operation when the motor vehicle is moving under automatic drive control.

Then, the engine must be controlled to cope with such a situation and make the motor vehicle move at a desired running speed. For example, the electronic throttle may need to be closed more from the normal level and the fail cut region may need to be modified to the lower revolution side but complicated procedures are required for such modifying actions.

According to this embodiment, however, automatic drive control is suspended or the control mode is released when any of the solenoids is found to have failed to realize very simple control operation for coping with a failed solenoid.

Additionally, with this embodiment, the suspension or release of automatic drive control is displayed by the indicator so that the driver may operate properly to cope with the situation. In other words, then the driver can drive the motor vehicle without relying on automatic drive control. Thus, any abnormal condition on the part of the automatic transmission can be dealt with simply by notifying the driver of the situation by means of a flashing indicator lamp and hence no complicated procedures are required.

It should be noted that the present invention is applicable not only to a cruise control apparatus but also to any other apparatus for controlling the transmission. Such apparatus may include those for automatically lowering the running speed of the motor vehicle (by way of a downward gear shifting operation to utilize the braking effect of the engine or by means of the use of the foot brake) when the inter-vehicular distance is reduced. Also, the present invention is applicable to a control apparatus for reducing the vehicle speed automatically when it detects any object exist in front of the vehicle. Also, the present invention is applicable to control apparatus as disclosed in Japanese Patent Laid-Open Publication Nos. Hei 5-106499 and Hei 7-69201.

What is claimed is:

1. An automatic drive controller for controlling the running speed of a motor vehicle according to the inter-vehicular distance between the motor vehicle and an object found in front of the motor vehicle, wherein the transmission of the motor vehicle is one of the objects controlled by the controller, and the controller comprises means for prohibiting automatic drive control operation when it detects an abnormality in the transmission.

2. An automatic drive controller according to claim 1, wherein said transmission is an automatic transmission provided with a hydraulic control unit and said hydraulic control unit is provided with solenoid devices for controlling the transmission; and said abnormality includes one or more failed solenoid devices.

3. An automatic drive controller for controlling the running speed of a motor vehicle according to the inter-vehicular distance between the motor vehicle and an object found in front of the motor vehicle, wherein the transmission of the motor vehicle as one of the objects controlled by the controller, and the controller comprises means for notifying the driver that the automatic drive control is inoperative when it detects an abnormality in the transmission.

4. An automatic drive controller according to claim 3, wherein said means for notifying the driver that the automatic drive control inoperative is an indicator lamp.

5. An automatic drive controller according to claim 3, wherein said means for notifying the driver that the automatic drive control inoperative is a device for emitting alarm sound.

6. An automatic drive controller according to claim 3, wherein said means for notifying the driver that the automatic drive control inoperative is a device providing a verbal warning.

\* \* \* \* \*